(12) United States Patent
Weinstock et al.

(10) Patent No.: US 12,207,669 B1
(45) Date of Patent: Jan. 28, 2025

(54) NOZZLE CONTROL ASSEMBLIES FOR A MICRO-PUREE MACHINE

(71) Applicant: SharkNinja Operating LLC, Needham, MA (US)

(72) Inventors: Noah William Weinstock, Boston, MA (US); Nathan Lyell, Surrey (GB); Jonathan James, Witney (GB); Michael John Blom, Cambridge (GB); Charles Frazer Kilby, Cambridgeshire (GB); Lukas Tubby, Mansfield, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/608,339

(22) Filed: Mar. 18, 2024

Related U.S. Application Data

(60) Provisional application No. 63/579,125, filed on Aug. 28, 2023.

(51) Int. Cl.
*A23G 9/28* (2006.01)
*A23G 9/12* (2006.01)
*A47J 43/07* (2006.01)

(52) U.S. Cl.
CPC .............. *A23G 9/281* (2013.01); *A23G 9/12* (2013.01); *A47J 43/0727* (2013.01)

(58) Field of Classification Search
CPC .................................................... A23G 9/281
See application file for complete search history.

(56) References Cited

U.S. PATENT DOCUMENTS

| | | | |
|---|---|---|---|
| 2,626,133 A | 1/1953 | Reed | |
| 2,719,494 A | 10/1955 | Spiess, Jr. et al. | |
| 2,889,949 A | 6/1959 | Morris | |
| 3,001,770 A | 9/1961 | Mueller | |
| 3,410,103 A * | 11/1968 | Cornelius | A23G 9/228 366/144 |
| 3,497,115 A * | 2/1970 | Cornelius | A23G 9/045 222/146.1 |
| 3,540,694 A * | 11/1970 | Cornelius | F16K 5/0414 251/317 |
| 3,815,871 A * | 6/1974 | Carlson | F16K 5/0414 251/310 |
| 4,420,948 A | 12/1983 | Savage | |

(Continued)

FOREIGN PATENT DOCUMENTS

| | | |
|---|---|---|
| CN | 102160593 A | 8/2011 |
| CN | 105947387 A | 9/2016 |

(Continued)

*Primary Examiner* — Marc C Howell
(74) *Attorney, Agent, or Firm* — The Webb Law Firm

(57) ABSTRACT

Nozzle control assemblies for a micro-puree machine include a bowl having a first end, a second end, and a sidewall extending between the first and send ends, the sidewall defining an interior volume of the bowl. The second end includes a nozzle in fluid communication with an interior of the bowl. A stopper is configured to be arranged in a first position, in which the stopper covers the nozzle, and a second position, in which the stopper does not cover the nozzle. A dial is assembleable to the second end of the bowl and configured to control extrusion of ingredients from the interior volume of the bowl through the nozzle.

17 Claims, 33 Drawing Sheets

(56) References Cited

U.S. PATENT DOCUMENTS

| | | | |
|---|---|---|---|
| 4,668,561 A | 5/1987 | Ney | |
| 4,693,611 A | 9/1987 | Verkler | |
| 4,707,997 A | 11/1987 | Bigler et al. | |
| 4,828,398 A | 5/1989 | Verkler | |
| 4,861,255 A | 8/1989 | Ney | |
| 4,974,965 A | 12/1990 | Heinhold et al. | |
| 5,208,050 A | 5/1993 | Ney | |
| 5,400,614 A | 3/1995 | Feola | |
| 5,463,878 A | 11/1995 | Parekh et al. | |
| 5,816,455 A | 10/1998 | Alpers et al. | |
| 5,893,485 A | 4/1999 | McGill | |
| 5,918,767 A | 7/1999 | McGill | |
| 6,012,702 A * | 1/2000 | Heimberger | F16K 27/062 137/240 |
| 6,068,160 A | 5/2000 | Fancher | |
| 6,119,905 A | 9/2000 | Cocchi et al. | |
| 6,435,377 B1 | 8/2002 | Iwata et al. | |
| 6,553,779 B1 | 4/2003 | Boyer et al. | |
| 6,817,749 B2 | 11/2004 | Saunders et al. | |
| 7,017,783 B1 | 3/2006 | Hunter et al. | |
| 7,159,743 B2 * | 1/2007 | Brandt | B67D 1/0083 222/129.1 |
| 7,278,555 B2 | 10/2007 | McGill | |
| 7,861,890 B2 | 1/2011 | McGill | |
| 8,196,782 B2 | 6/2012 | De Blasi | |
| 8,297,182 B2 | 10/2012 | Cocchi et al. | |
| 8,561,839 B2 | 10/2013 | Cocchi et al. | |
| 8,616,250 B2 | 12/2013 | Herbert | |
| 8,887,522 B2 | 11/2014 | Grampassi | |
| 9,560,865 B2 | 2/2017 | Cocchi et al. | |
| 10,694,764 B2 | 6/2020 | Zappoli et al. | |
| 11,064,715 B2 | 7/2021 | Herbert et al. | |
| 11,102,992 B2 | 8/2021 | Douer | |
| 11,134,703 B2 | 10/2021 | Cocchi et al. | |
| 11,185,091 B2 | 11/2021 | Koehl et al. | |
| 11,259,542 B2 | 3/2022 | Jacob et al. | |
| 11,486,631 B2 | 11/2022 | Fonte et al. | |
| 11,528,922 B2 | 12/2022 | Beth Halachmi | |
| 11,622,568 B2 | 4/2023 | Kaliszewski et al. | |
| 11,627,747 B2 | 4/2023 | Fonte et al. | |
| 2004/0161503 A1 | 8/2004 | Malone et al. | |
| 2005/0173462 A1 | 8/2005 | Stumler et al. | |
| 2005/0183426 A1 | 8/2005 | Learned | |
| 2006/0169727 A1 | 8/2006 | Cocchi et al. | |
| 2007/0110872 A1 | 5/2007 | Gerber | |
| 2007/0199614 A1 | 8/2007 | Cocchi et al. | |
| 2010/0116846 A1 | 5/2010 | Cortese et al. | |
| 2010/0147875 A1 * | 6/2010 | Santos | B67D 1/0021 222/1 |
| 2012/0205395 A1 | 8/2012 | McGill | |
| 2016/0255859 A1 | 9/2016 | Salerno | |
| 2016/0345605 A1 | 12/2016 | McGill et al. | |
| 2019/0008181 A1 | 1/2019 | Scott et al. | |
| 2019/0053515 A1 | 2/2019 | Stojkovski et al. | |
| 2020/0260756 A1 | 8/2020 | Crundwell et al. | |
| 2021/0068419 A1 | 3/2021 | Spirk et al. | |
| 2022/0110339 A1 | 4/2022 | Beth Halachmi et al. | |
| 2022/0159992 A1 | 5/2022 | Hugenroth et al. | |

FOREIGN PATENT DOCUMENTS

| | | |
|---|---|---|
| CN | 106073449 A | 11/2016 |
| CN | 107125424 A | 9/2017 |
| EP | 0995685 B1 | 4/2003 |
| EP | 1123010 B1 | 4/2003 |
| EP | 1186240 B1 | 8/2005 |
| EP | 1763478 A2 | 3/2007 |
| EP | 2151168 B1 | 4/2015 |
| EP | 2708141 B1 | 4/2018 |
| EP | 3616528 A1 | 3/2020 |
| EP | 3305090 B1 | 4/2020 |
| EP | 3292768 B1 | 3/2021 |
| GB | 2342957 A | 4/2000 |
| GB | 2344139 A | 5/2000 |
| GB | 2414225 A | 11/2005 |
| WO | 2004103831 A3 | 12/2004 |
| WO | 2005113387 A2 | 12/2005 |
| WO | 2007121967 A3 | 2/2008 |
| WO | 2014098547 A1 | 6/2014 |
| WO | 2015011691 A1 | 1/2015 |
| WO | 2022108696 A1 | 5/2022 |
| WO | 2023097434 A1 | 6/2023 |

* cited by examiner

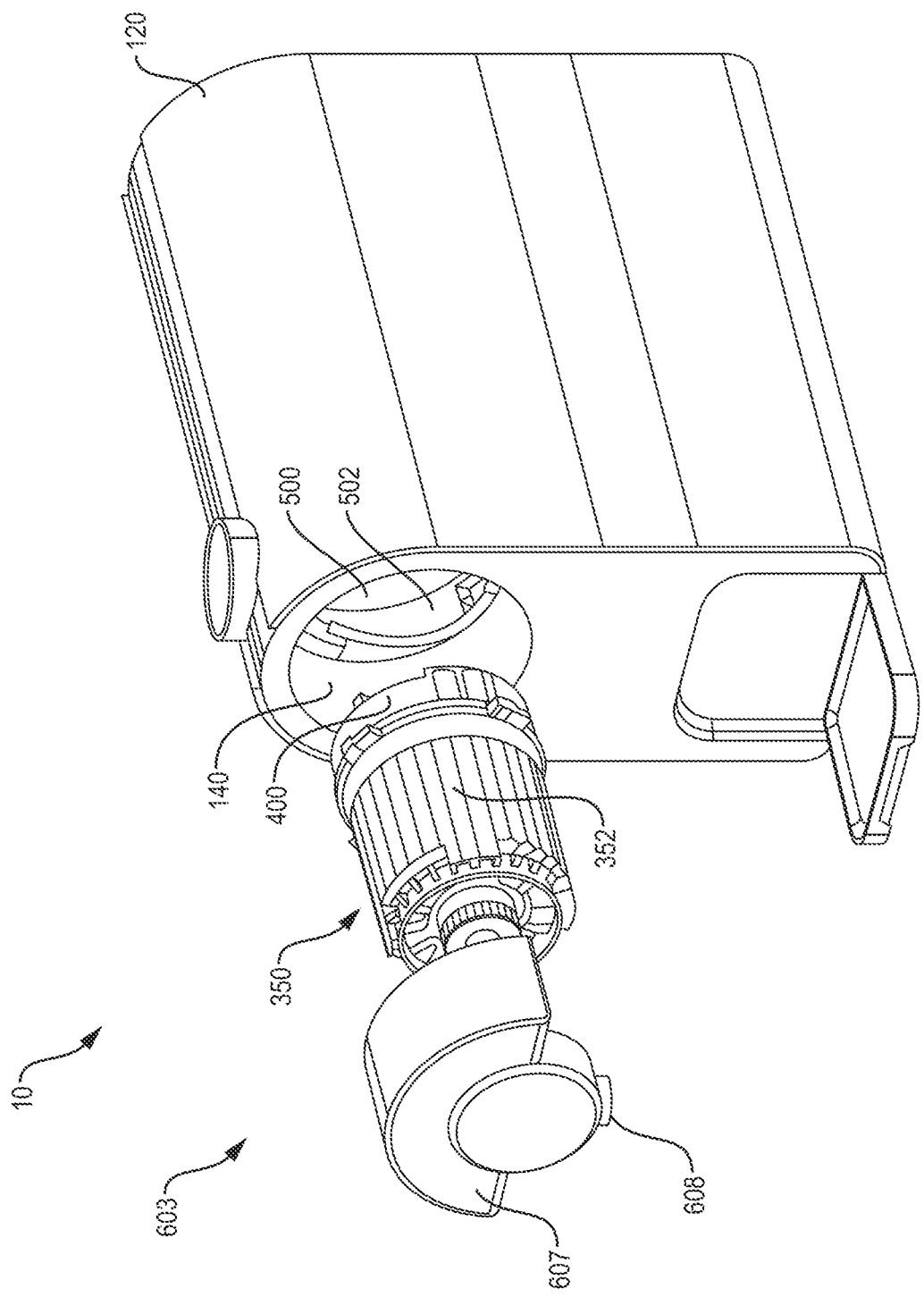

NOZZLE CONTROL ASSEMBLIES FOR A MICRO-PUREE MACHINE

CROSS-REFERENCE TO RELATED APPLICATIONS

This application claims priority to and benefit of U.S. Provisional Application No. 63/579,125, filed on Aug. 28, 2023, entitled INTEGRATED NOZZLE SYSTEM FOR A MICRO PUREE MACHINE, the entire contents of which are incorporated herein by reference for all purposes.

FIELD

The present disclosure relates to a food processing device and, more particularly, to a micro-puree machine with an integrated nozzle for dispensing ingredients from the food processing bowl.

BACKGROUND

Domestic kitchen appliances that are intended to make ice creams, gelatos, frozen yogurts, sorbets and the like are known in the art. Typically, a user adds a series of non-frozen ingredients to a mixing bowl, which often has been previously cooled, for example, in a freezer. The ingredients are then churned by a one or more paddles (sometimes referred to as dashers) while a refrigeration mechanism simultaneously freezes the ingredients. These devices have known shortcomings including, but not limited to, the amount of time and effort required by the user to complete the ice cream-making process. Machines of this nature are also impractical for preparing most non-dessert food products.

An alternative type of machine known for making a frozen food product may be referred to as a micro-puree machine. Typically, machines of this nature spin and plunge a blade into a pre-frozen ingredient or combination of ingredients. While able to make frozen desserts like ice creams, gelatos, frozen yogurts, sorbets and the like, micro-puree machines can also prepare non-dessert types of foods such as non-dessert purees and mousses.

SUMMARY

The disclosure, in various embodiments, describes a nozzle system integrated with a processing bowl for a micro-puree machine that may allow for a seamless transition between processing the ingredients in the processing bowl and extrusion of the ingredients from the bowl. A rotatable dial may attach to the bowl to control the extrusion of the ingredients from the bowl.

In embodiments, a nozzle control assembly of this disclosure is for a bowl for use with a micro-puree machine. The bowl has a first end, a second end, and a sidewall extending between the first and send ends. The sidewall defines an interior volume of the bowl. The second end of the bowl includes a nozzle in fluid communication with an interior of the bowl. The nozzle control assembly includes a stopper configured to be arranged in a first position, in which the stopper covers the nozzle, and a second position, in which the stopper does not cover the nozzle. A dial is rotatable relative to the second end of the bowl. The dial is configured to control extrusion of processed ingredients from the interior volume of the bowl through the nozzle.

In further embodiments, the bowl is configured to be oriented relative to the micro-puree machine such that the nozzle is positioned in a vertically downward direction. In embodiments, the nozzle is integrated with the bowl. In embodiments, the nozzle is positioned near the second end of the bowl. In embodiments, the stopper is a hinged plug. In embodiments, the dial is configured to move the stopper from the first position to the second position. In embodiments, the stopper is biased towards the second position. In embodiments, the stopper includes a tab configured to lock into a CAM path on the dial when the stopper is in the first position. In embodiments, the dial is biased in a first rotational direction, and rotation of the rotatable dial in a second rotational direction causes the tab to disengage from the CAM path. In embodiments, manual movement of the stopper from the second position to the first position causes the rotatable dial to rotate in the second rotational direction. In embodiments, an outer surface of the second end of the bowl defines at least one cam track extending at least partially around the second end of the bowl. In embodiments, an interior surface of the dial includes at least one pin for engaging the at least one cam track for rotating the dial between an open position and a closed position. In embodiments, in the closed position, a seal on the dial engages an opening in the bowl, preventing the extrusion of the processed ingredients from the interior volume of the bowl through the nozzle. In embodiments, in the open position, the seal on the dial is spaced away from the opening, allowing the extrusion of the processed ingredients from the interior volume of the bowl through the nozzle. In embodiments, the stopper is a cap.

Embodiments of a bowl for use with a micro-puree machine of this disclosure include a first end, a second end, and a sidewall extending between the first and send ends. The sidewall defines an interior volume of the bowl. The second end of the bowl includes a nozzle in fluid communication with an interior of the bowl. A stopper is configured to be arranged in a first position, in which the stopper covers the nozzle, and a second position, in which the stopper does not cover the nozzle. A dial is rotatable relative to the second end of the bowl. The dial is configured to control extrusion of processed ingredients from the interior volume of the bowl through the nozzle. In embodiments, the bowl is configured to be oriented relative to the micro-puree machine such that the nozzle is positioned in a vertically downward direction. In embodiments, the nozzle is integrated with the bowl. In embodiments, the nozzle is positioned near the second end of the bowl. In embodiments, the stopper is one of a hinged plug and a cap.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein:

FIG. 1B shows the micro-puree machine of FIG. 1A with the bowl assembly disassembled from the housing, according to some embodiments of the disclosure.

DETAILED DESCRIPTION

Figure 1A:
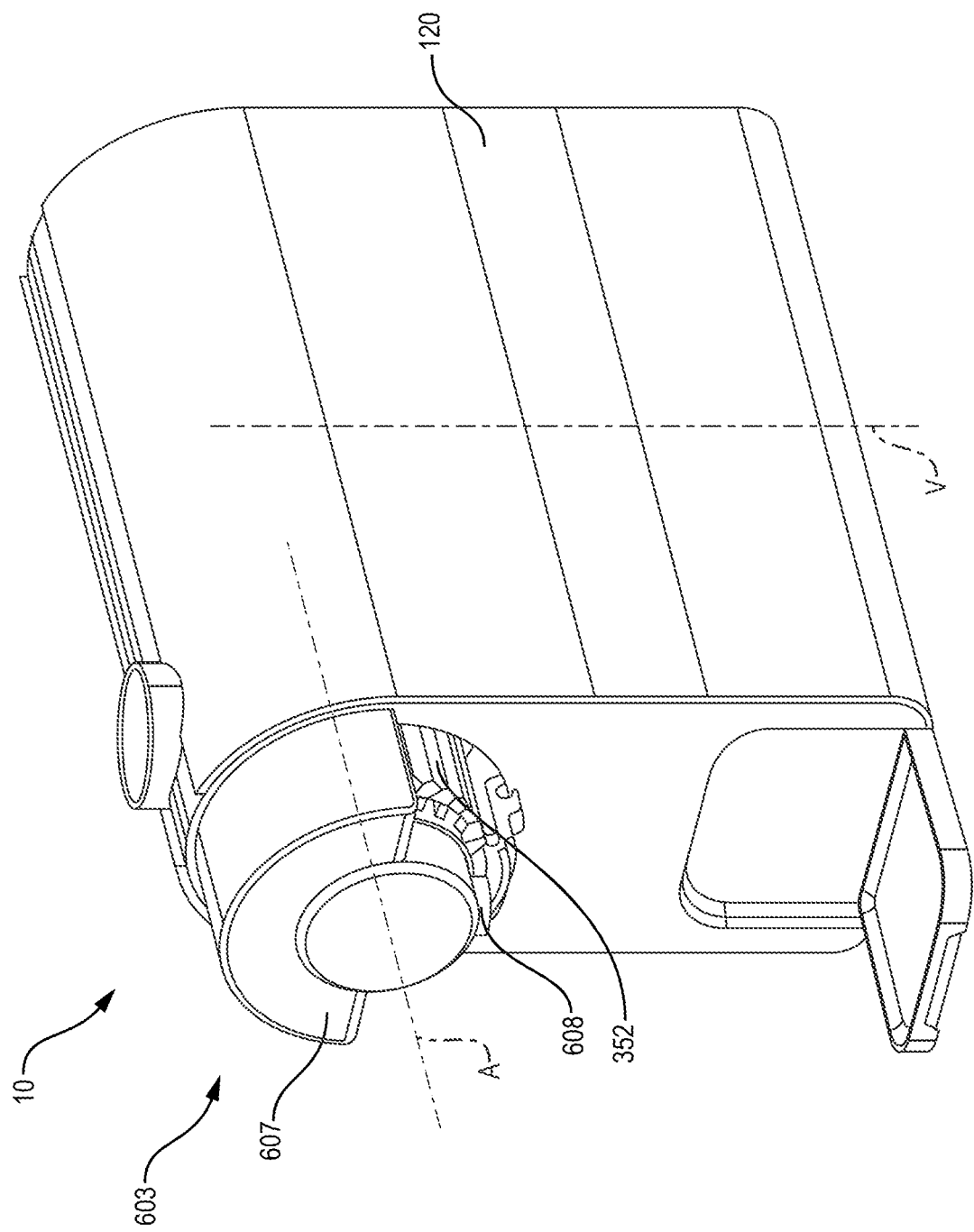
FIG. 1A shows an isometric view of a micro-puree machine, according to some embodiments of the disclosure.

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the disclosure in any manner.

Notably, the mechanisms and techniques described herein may be used to configure a machine to process (e.g., micro-puree and perhaps aerate) and extrude ice cream and other frozen ingredients. That is, both the processing and extrusion functions can be performed by a single machine. In such a machine, a same shaft may be used to drive a blade to process the frozen ingredients in a bowl (i.e., a container) and to drive a plunger to extrude the processed ingredients from the bowl. Further, such a machine may include a user interface enabling a user to control the timing of the performance of each function. In some implementations of such a machine, a first shaft may be used to drive processing and a second shaft may be used to drive extrusion, and such implementations may be considered to have a first sub-system or module for processing and a second sub-system or module for extrusion.

In some embodiments, a single lid may be provided (e.g., on an open end of the bowl) that houses (or is coupled to) a blade for processing ingredients, and that also houses (or is coupled to) a plunger for extruding the processed ingredients. In such embodiments, a single shaft driven by one or more motors (e.g., one motor for driving rotation of blade; the other motor for driving linear movement of the driven shaft along its axis) may drive both the processing that uses the blade and the extrusion that uses the plunger, as described in more detail elsewhere herein, and an end of the bowl opposite the lid may include an opening for extrusion of the processed ingredients from the bowl.

In other embodiments, to enable the performance of both functions, the user may flip the processing bowl from a first arrangement, in which the driven shaft engages a blade at a first end of the processing bowl (e.g., the blade housed in or coupled to a first lid at a first open end of the processing bowl), to a second arrangement, in which the driven shaft engages a plunger at a second end of the processing bowl (e.g., the plunger housed in or coupled to a second lid at an open second end of the processing bowl), as described in more detail herein. In such embodiments, the first lid also may include an opening for extruding the ingredients from the bowl during extrusion using the plunger in the second arrangement. Further, in such embodiments, a single shaft driven by one or more motors may drive both the processing by use of the blade and the extrusion by use of the plunger, as described in more detail elsewhere herein.

In other embodiments, to enable the performance of both functions, the user may replace a first lid (e.g., housing or coupled to a blade) for processing from an open end of the processing bowl with a second lid (e.g., housing or coupled to a plunger) for extruding, as described in more detail elsewhere herein. In such embodiments, a single shaft driven by one or more motors may drive both the processing by use of the blade and the extrusion by use of the plunger, or alternatively, a separate shaft may be used for extruding, in which such separate shaft drives the plunger, as described in more detail elsewhere herein.

FIG. 1A shows an isometric view of a micro-puree machine 10 according, to some embodiments of the disclosure. FIG. 1B shows the micro-puree machine 10 of FIG. 1A with the bowl assembly 350 disassembled from the housing 120 according to some embodiments of the disclosure. FIGS. 1C-1G illustrate embodiments of the extrusion assemblies, bowl assemblies, and/or nozzle assemblies, according to some embodiments of the disclosure.

The micro-puree machine 10 may include a housing 120, which may include a user interface (not shown) for receiving user inputs to control the micro-puree machine 10 and/or display information. The micro-puree machine 10 also may include a bowl assembly 350 and a nozzle assembly 603. The combination of a bowl assembly 350, which may include a lid 400 configured for extruding, and a nozzle assembly 605 may be referred to herein as an extrusion assembly. The nozzle assembly 603 may include a nozzle housing 607 and a nozzle 608.

The bowl assembly 350 may include a bowl 352 configured to contain one or more processed ingredients, ingredients to be processed, or ingredients being processed. A user may couple the bowl assembly 350 to the housing 120 by rotating the bowl assembly 350 relative to the housing 120 (e.g., using screwing threads or a bayonet connection), or by another coupling mechanism and/or technique. The bowl assembly 350 may be assembled to the housing 120 such that a central axis A of the bowl assembly 350 extends perpendicular to a vertical axis V of the housing 120, as shown. However, the disclosure contemplates that the bowl assembly 350 may be assembled to the housing 120 such that the central axis A extends at an angle between 0 and 90° to the vertical axis, for example, as described in U.S. Pat. No. 11,759,057 to SharkNinja Operating, LLC, the entire contents of which are hereby incorporated by reference (the '057 patent), or such that the central axis of the bowl assembly 350 extends parallel to the vertical axis V, for example, as described in U.S. Pat. No. 11,871,765 to SharkNinja Operating, LLC, the entire contents of which are hereby incorporated by reference (the '756 patent). In embodiments, the bowl 352 of the bowl assembly 350 can be manufactured from a disposable material to enhance the convenience of using the micro-puree machine 10. Further, the bowl 352 can be sold as a stand-alone item and can also be prefilled with ingredients to be processed during use of the micro-puree machine 10.

As shown in FIG. 1B, the housing 120 may including a coupling 500 disposed within an opening 140 of the housing 120. An inner surface 502 of the coupling 500 may comprise locating and locking elements for positioning and connecting the bowl assembly 350 to the coupling 500 in two different configurations, as described elsewhere herein. The micro-puree machine 10 may further include a nozzle 608 couplable to the bowl assembly 350 for extruding processed ingredients from the bowl assembly 350. The nozzle 608 may be arranged such that the ingredients are extruded in a vertically downward direction such that a user can place an ice cream cone, cup, bowl, or other edible or non-edible receptacle underneath the nozzle to receive extruded ingredients. The disclosure also contemplates that multiple nozzle shapes may be provided to allow for user customizability. For example, multiple nozzles may be included on a rotatable dial that allows the user to select the desired nozzle shape. In further embodiments, the extrude function may be integrated into a program on the user interface with a predetermined translation speed/flow rate.

Figure 1C:
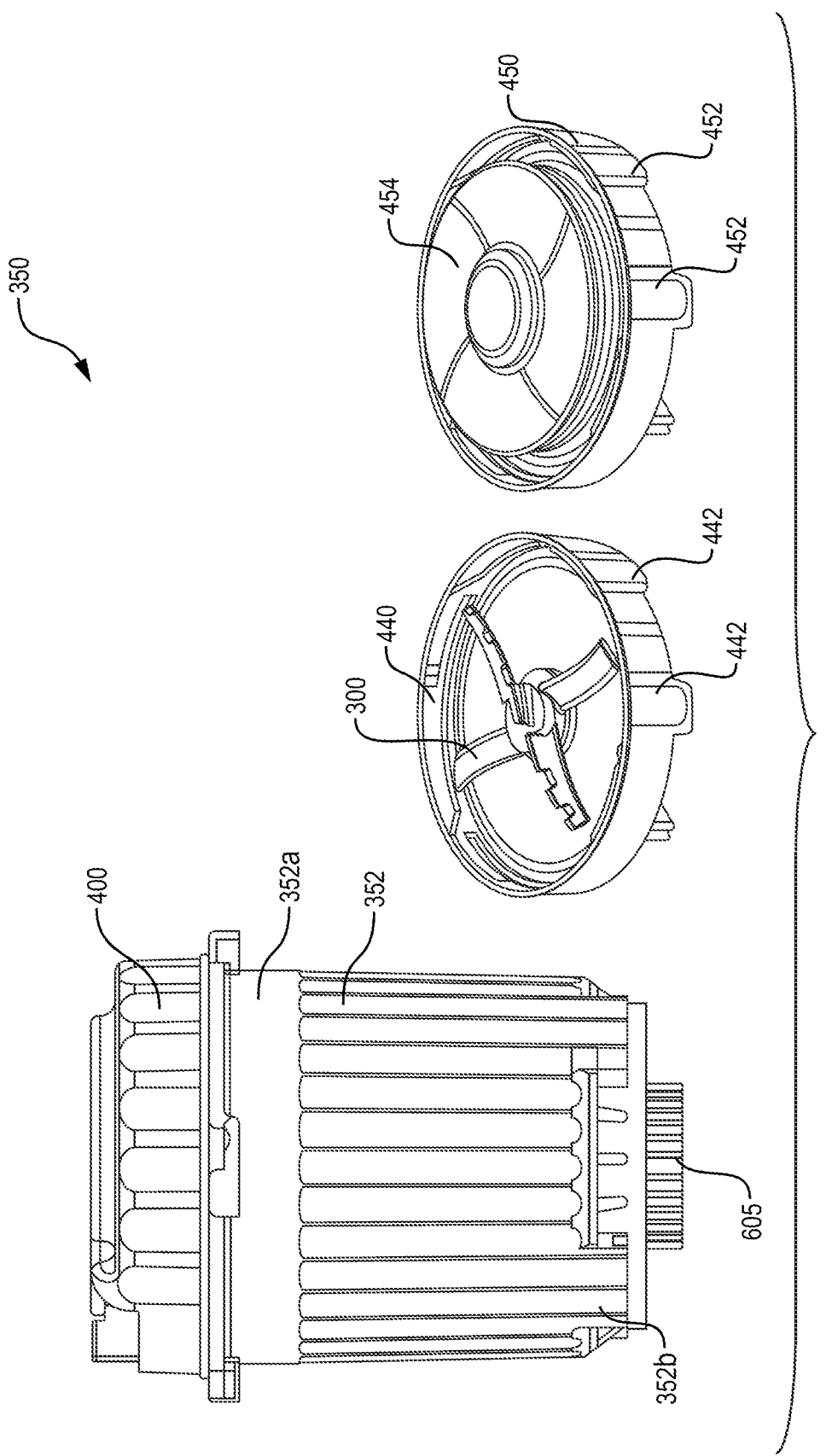
FIGS. 1C-1G illustrate embodiments of extrusion assemblies, bowl assemblies, and/or nozzle assemblies of the micro-puree machine of FIG. 1A, according to some embodiments of the disclosure.

As shown in FIG. 1C, the first end 352*a* of the bowl 352 may be configured to couple to both a first lid 440 and the second lid 450. The first lid 440 may include a blade 300 for processing ingredients, for example, a blade as described in the '765 patent. When the lid 440 is coupled to the bowl 352 (e.g., via reciprocal threading on the bowl and lid), the bowl assembly 350 may be considered to be in a processing configuration and may be coupled to the housing via coupling 500. The lid 440 may have locating and locking elements 442 on its exterior sidewall configured to couple to the locating and locking elements on the inner surface 502 of the coupling 500. The second lid 450 may include a plunger 454 for extruding ingredients. The plunger 454 may furthermore include a flexible seal around its perimeter to ensure contact (e.g., maximum contact) with the sidewall of the bowl 352 to allow for optimal (e.g., maximum) extrusion yield. When the lid 450 is coupled to the bowl 352 (e.g., via reciprocal threading on the bowl and lid), the bowl assembly 350 may be considered to be in an extruding configuration and may be coupled to the housing via coupling 500. The lid 450 may have locating and locking elements 452 on its exterior sidewall configured to couple to the locating and locking elements on the inner surface 502 of the coupling 500.

The second end 352*b* of the bowl 352 may include a centrally located opening 604, or an opening that is not centrally located, including a coupling collar 606. The coupling collar 606 may include threading or other types of coupling features, for example, slots or cams, e.g., for bayoneting. The opening 604 may be enclosed by a cap 605, for example, during processing, which cap may be removed during extruding. The cap 605 may include interior threading (not shown) or other coupling features that allow it to couple to the coupling collar 606. The opening 604 may further be in fluid communication with a nozzle 608. For example, the opening 604 may be in fluid communication with a nozzle through a conduit (e.g., plastic tubing) that extends from the opening 604 to the nozzle 608, e.g., within nozzle assembly 603. In embodiments, such a conduit may include one or more sections connected by joints (e.g., an elbow joint) to translate the direction (e.g., horizontal) of extrusion from opening 604 to a direction (e.g., vertically downward) of extrusion from the nozzle 608.

Figure 1D:
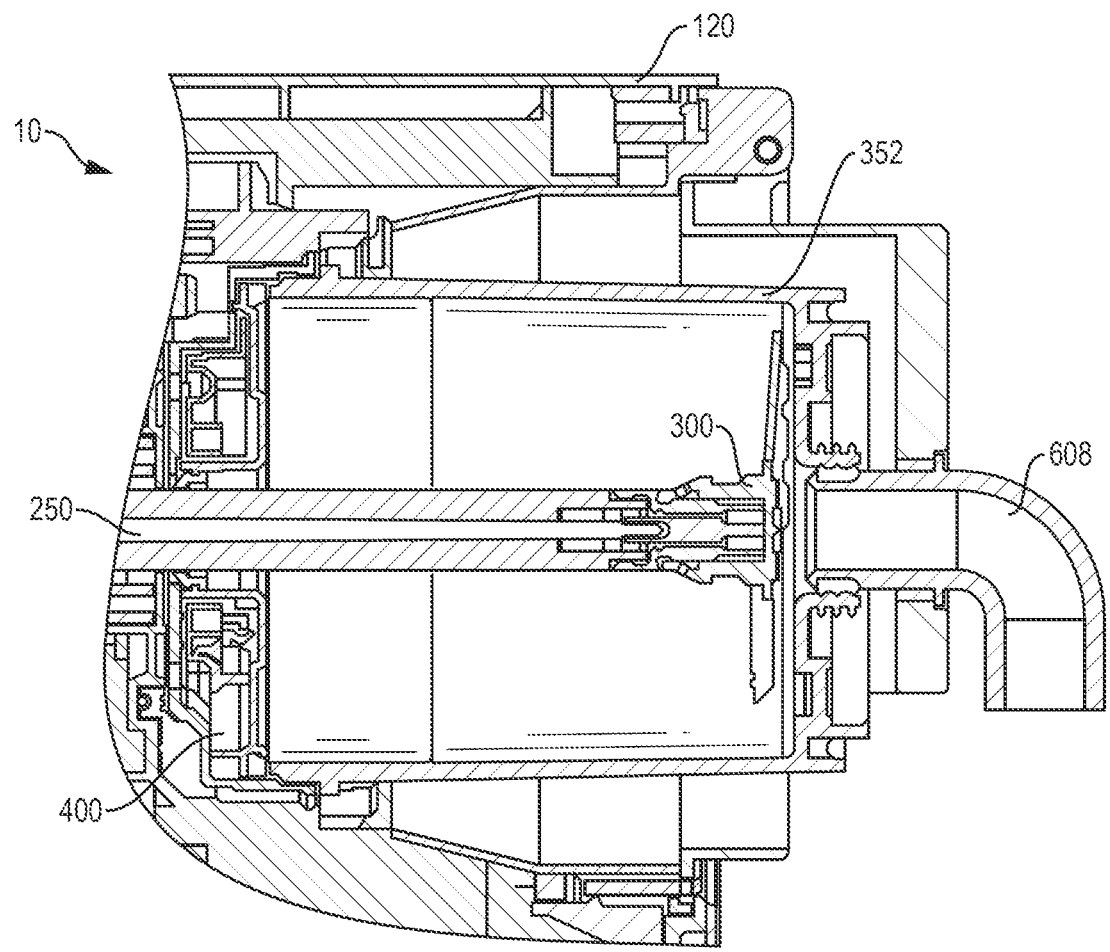
Figure 1E:
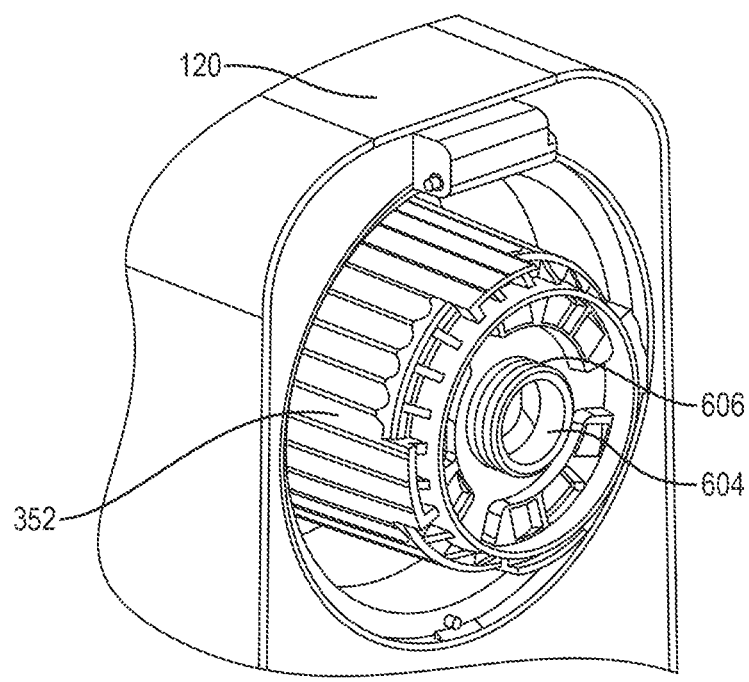

As shown in FIG. 1D, the user may attach the first lid 440 to the bowl 352 and couple the bowl assembly 350 to the micro-puree machine 10 using the coupling features described herein. The lid 440 may be configured (e.g., as described in the '765 patent) such that, when the lid 440 is coupling to the housing 120, the blade 300 engages a driven shaft 250 and disengages the lid 440. Through use of a user interface (e.g., as described in the '057 patent), the user may activate a program that controls the blade 300 to rotate and move (e.g., descend or move horizontally or at an angle) into the ingredients in the bowl 352 to process (e.g., micro-puree) them. It should be appreciated that in some embodiments, as shown in FIG. 1D, the nozzle assembly 603 or one or more components thereof (e.g., nozzle 608) may be coupled to the second end 352*b* of the bowl 350 (and perhaps to the housing) even when extrusion is not being performed, e.g., during processing. In such embodiments, the opening 604 may be closed, for example, using cap 605 or by other means. FIG. 1E is a bottom view of the bowl assembly 350 while coupled to the housing, in which the opening 604 is not covered. In actual use, the opening 604 may be closed, e.g., by cap 605, during processing, or open and coupled to the nozzle assembly 603 during extrusion.

After processing the ingredients in the bowl 352, the user then may remove the bowl assembly 350 from the micro-puree machine 10, remove the first lid 440 from first end 352*a*, replace it with lid 450 on the first end 352*a*, couple the nozzle assembly to the second end 352*b* of the bowl assembly 350 if not already attached, couple the bowl assembly 350 to the housing 120, and initiate extrusion via the user interface. During extrusion, the driven shaft drives the plunger 602 from the first end 352*a* of the bowl 352 to the second end 352*b* of the bowl, forcing the processed ingredients to extrude the processed ingredients through the opening 604 and through the nozzle 608.

Figure 1F:
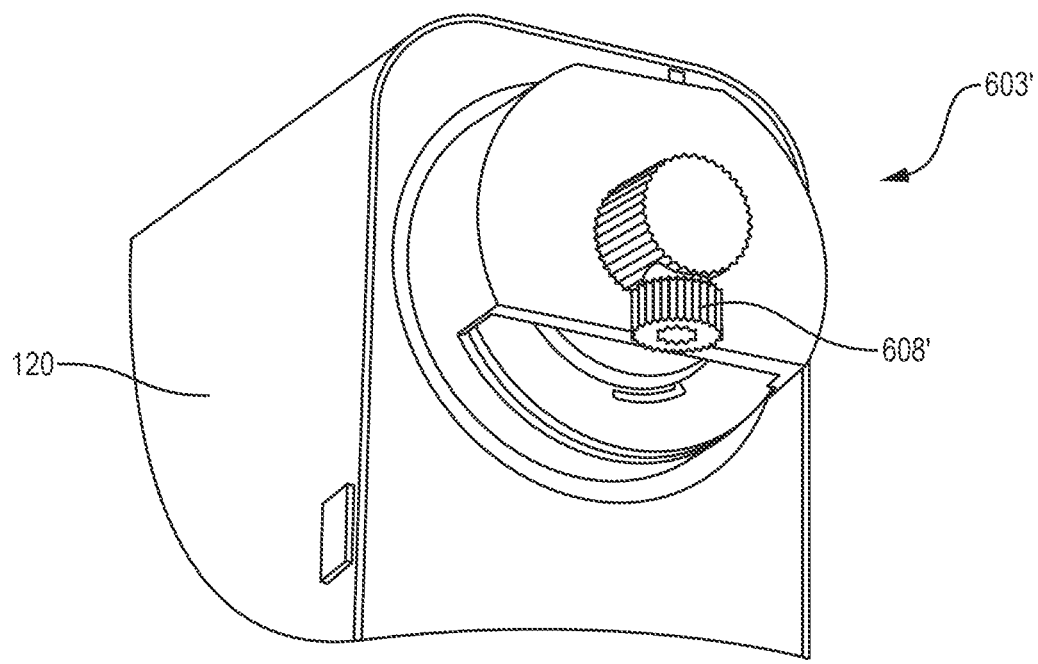

FIG. 1F illustrates another embodiment of a nozzle assembly 603', including nozzle 608', which may be used to extrude processed ingredients, for example, using mechanisms and techniques described herein.

Figure 1G:
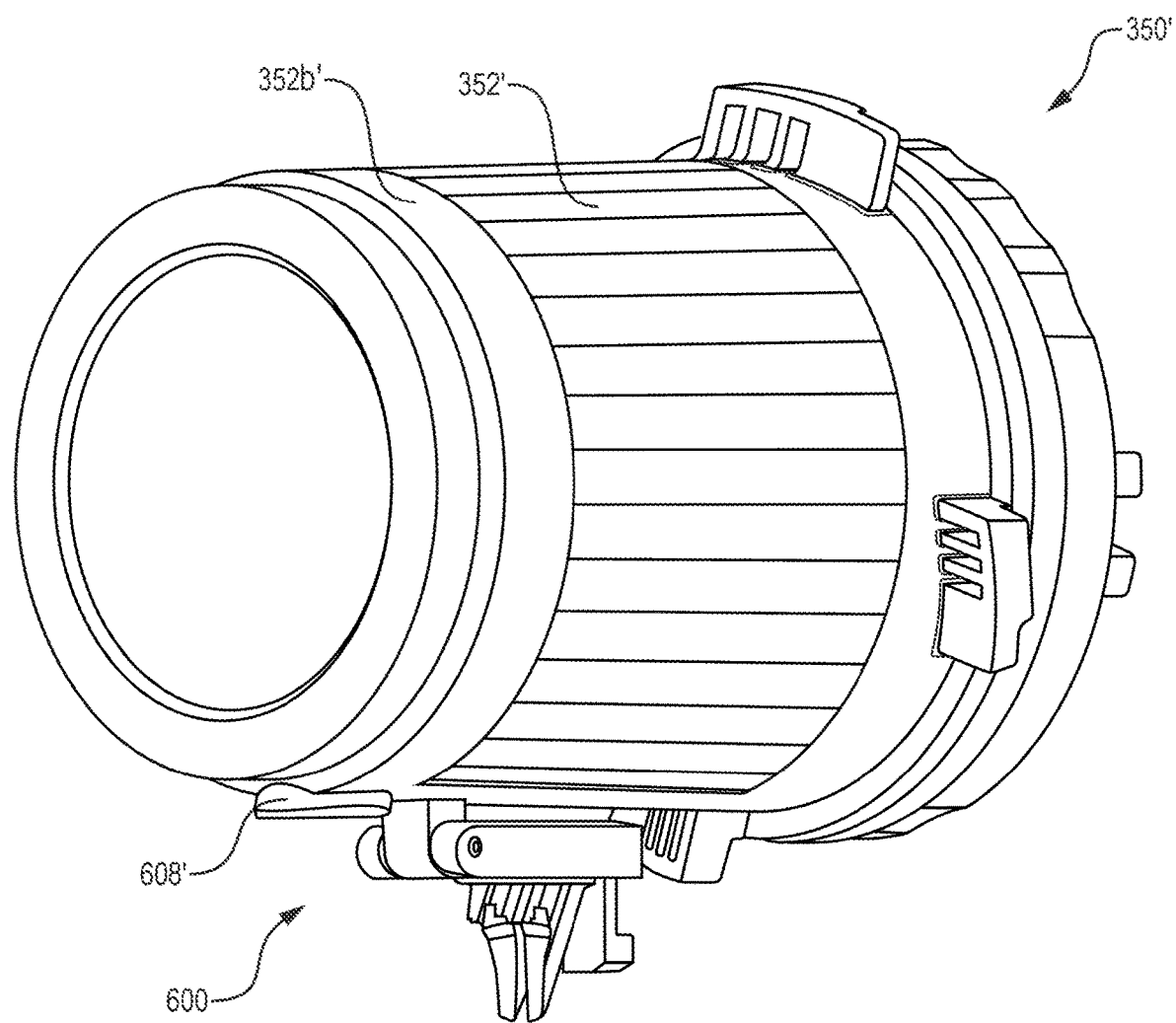

FIG. 1G illustrates another bowl assembly 350' including the extrusion assembly 600 according to some embodiments of the disclosure. As shown in FIG. 1G, the bowl assembly 350' may include a nozzle 608' that is integrated with the bottom edge of the bowl 352', for example, on the sidewall of the bowl 352' proximate to a second end 352b' or extending past the second end 352b'. In embodiments, the bowl assembly 350' may be configured to be installed to the coupling 500 such that the nozzle 608' faces vertically downwards when the bowl 352' is properly installed. During extrusion, the movement of the plunger (e.g., plunger 454) will force the processed ingredients through the nozzle 608'. The nozzle 608' may be selectively located on the bowl 352' to optimize the amount of processed ingredients that can be extruded, thus minimizing the amount of yield loss after extrusion. For example, the nozzle 608' may be located near the bottom edge of the bowl 352', as shown in FIG. 1G. However, the disclosure contemplates that the nozzle 608' may alternatively be located at a different longitudinal and/or radial position on the bowl 352'. Bowl assembly 350' and/or bowl 352' maybe be the same or different than bowl assembly 350 and/or bowl 352, respectively.

Advantageously, the micro-puree machine 10 may include a sensor (not shown) that recognizes which lid is installed into the machine 10 to restrict certain programs based on the lid functions, which may prevent user error when operating the machine 10. For example, the micro-puree machine may only activate the blade 300 when the sensor detects that the bowl 352 is installed in the first configuration in which lid 440 is coupled to bowl 350 and may only activate the plunger 602 when the sensor detects that the bowl 352 is installed in the second configuration in which lid 440 is coupled to bowl 350. For example, each of lid 440 and 450 may include distinctive physical and/or electromagnetic features, e.g., as part of locating and locking elements 442 and 452, respectively, for which coupling 500 or other elements of the micro-puree machine 10 may be configured to detect and distinguish lid 440 from lid 450.

The housing 120 may house one or more motors and a transmission system (e.g., including gearing) that drive a driven shaft (e.g., driven shaft 250) for engaging the blade 300 and/or plunger 454 when the bowl assembly 350 (coupled to lid 440 or 450, respectively) is coupled to the housing for processing or extruding, respectively, for example, as described in the '765 patent or U.S. Pat. No. 11,882,965 to SharkNinja Operating, LLC (the '965 patent), the entire contents of which are hereby incorporated by reference. For example, the one or more motors may include a first motor for driving rotation of the driven shaft 250 via the transmission, which may be used to drive the rotation of the blade 300 during processing, and, if desired (but not necessary) rotating the plunger 454 during extrusion. A second motor may be configured to move the position of the driven shaft 250, via the transmission, along its axis (e.g., back and forth; or up and down), which may be used to drive the back-and-forth movement of the blade 300 into and out of the bowl 350 during processing, and to move the plunger 454 into and out of the bowl 350 during extrusion. In embodiments, the micro-puree machine 10 may include gearboxes (e.g., high ratio gearboxes) and reinforced internals (not shown) to allow an extrusion assembly as described herein to withstand high forces and extrude thick outputs from the nozzle 608.

In some embodiments of the disclosure, a reversible bowl assembly may be used, which does not require that a lid be removed between processing and extruding. For example, the reversible bowl assembly may include: a first lid coupled at one end including a blade for processing and an opening for extruding; and a second lid at the other end including a plunger for extruding. Examples of such embodiments will now be described.

Figure 2A:
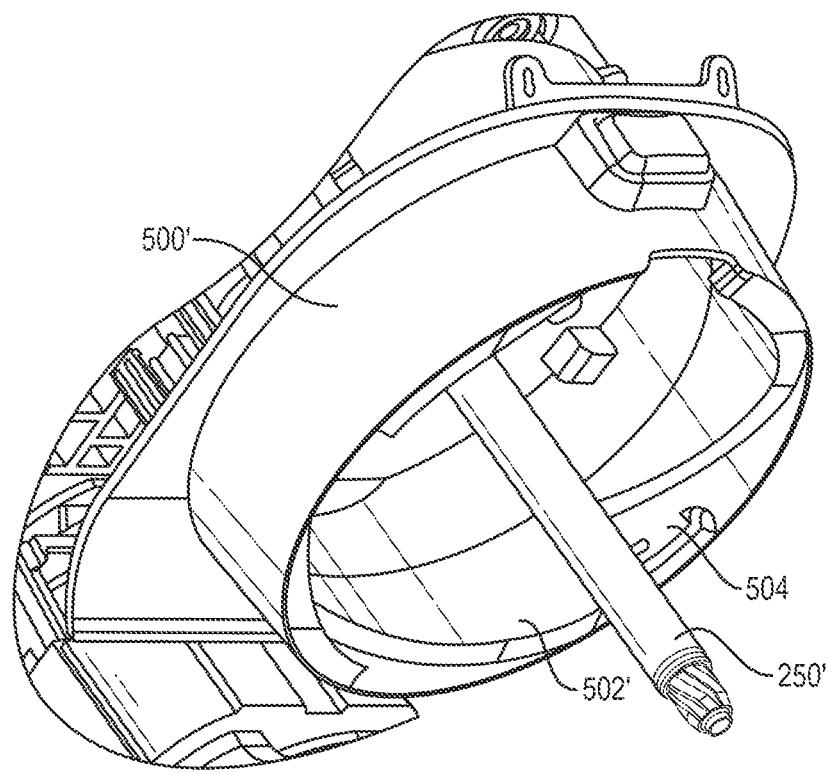
FIG. 2A illustrates a portion of another micro-puree machine, according to some embodiments of the disclosure.
Figure 2B:
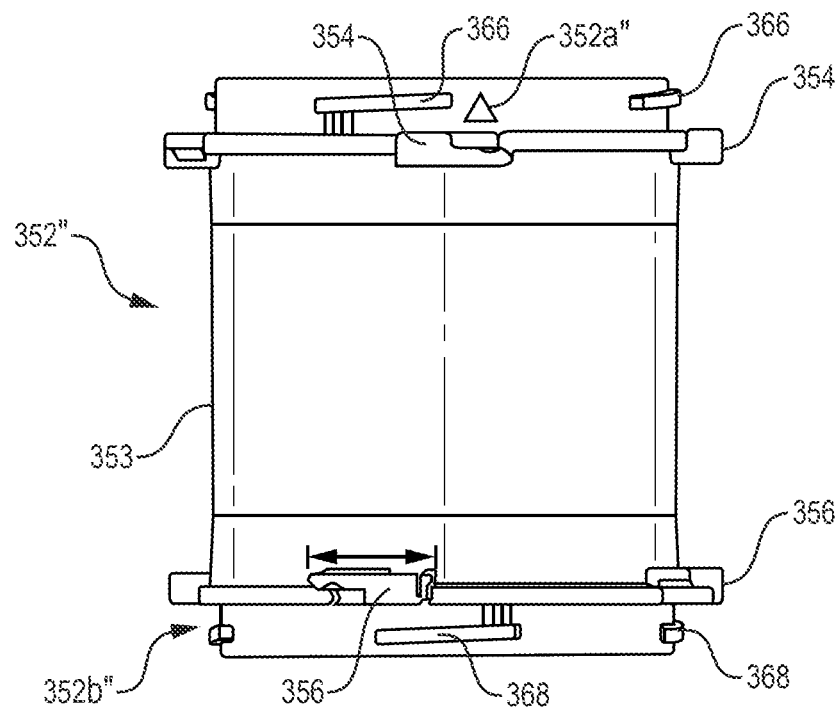
FIG. 2B illustrates a reversible bowl assembly that may be coupled to the micro-puree machine of FIG. 2A, according to some embodiments of the disclosure.

FIG. 2A illustrates an embodiment of a portion of a micro-puree machine including a coupling 500' for coupling to a bowl assembly, for example, a reversible bowl assembly, in accordance with some embodiments of the disclosure. FIG. 2B illustrates an embodiment of a reversible bowl 352" that may be coupled to coupling 500'. The bowl 352" may include any of a variety of external surfaces. For example, embodiments of the bowl may have a ribbed or corrugated surface (e.g., like bowl 352 or 352'), or a smooth surface (e.g., bowl 352"). Similarly, bowls 352 and 352" may have any variety of surfaces, including smooth surfaces.

As shown in FIG. 2A, the driven shaft 250 of the micro-puree machine 10 may extend from the housing 120 into an interior of the coupling 500' and optionally all the way through the interior of the coupling 500'. The inner surface 502' of the coupling 500' may comprise one or more slots 504 sized and shaped to receive at least one projection 354 on an outer surface of a first open end 352a" of the bowl 352". In embodiments, both the first end 352a" and the second end 352b" of the bowl 352" may be open-that is, both the first end 352a" and the second end 352b" may not have a top or bottom wall and/or a lid. However, the disclosure is not so limited, and one or both ends 352a", 352b" of the bowl 352" may be closed with a wall or a lid. In embodiments, the at least one projection 354" on the bowl 352" may be four projections 354 spaced 90 degrees apart about an outer surface of the first end 352a" of the bowl 352". However, the disclosure contemplates more or fewer than four projections 354. In a first configuration of the reversible bowl assembly 350", the user may rotate the bowl 352" relative to the coupling 500' such that the projections 354 are rotated into the slots 504, coupling (e.g., locking) the bowl 352" and the coupling 500 together.

The slots 504 also may be sized and shaped to receive at least one projection 356 on an outer surface of a second open end 352b" of the bowl 352". In embodiments, the at least one projection 356 may be four projections 356 spaced 90 degrees apart about an outer surface of the second end 352b" of the bowl 352". However, the disclosure contemplates more or fewer than four projections 356. In a second configuration of the reversible bowl assembly 350", the user may rotate the bowl 352" relative to the coupling 500' such that the projections 356 are rotated into the slots 504, coupling (e.g., locking) the bowl 352" and the coupling 500' together. The first end 352a" of the bowl 352" may further comprise threads 366 for coupling to a first lid, while the second end 352b" of the bowl 352" may comprise threads 368 for coupling to a second lid, as further described elsewhere herein.

Figure 3A:
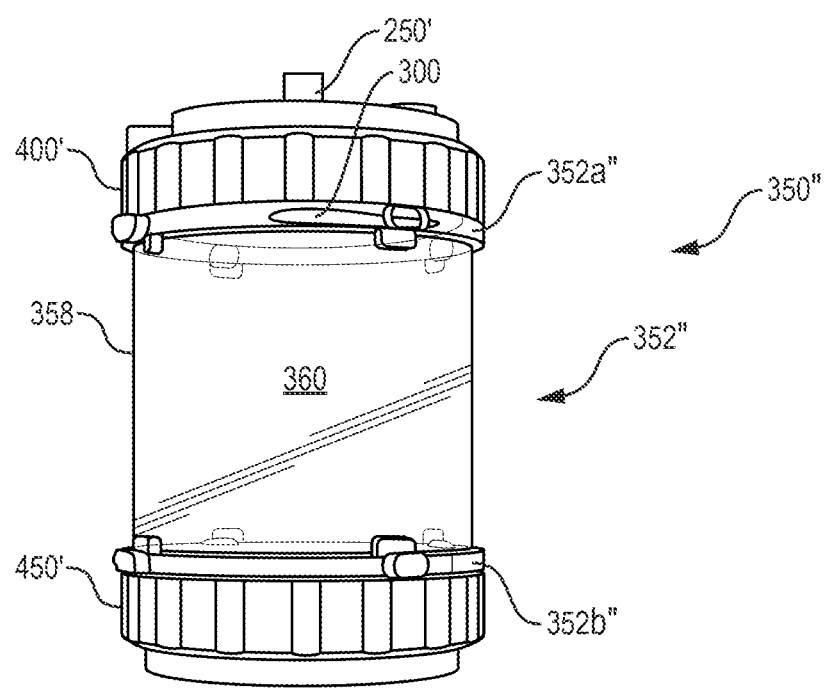
FIG. 3A shows another reversible bowl assembly, according to some embodiments of the disclosure.
Figure 3B:
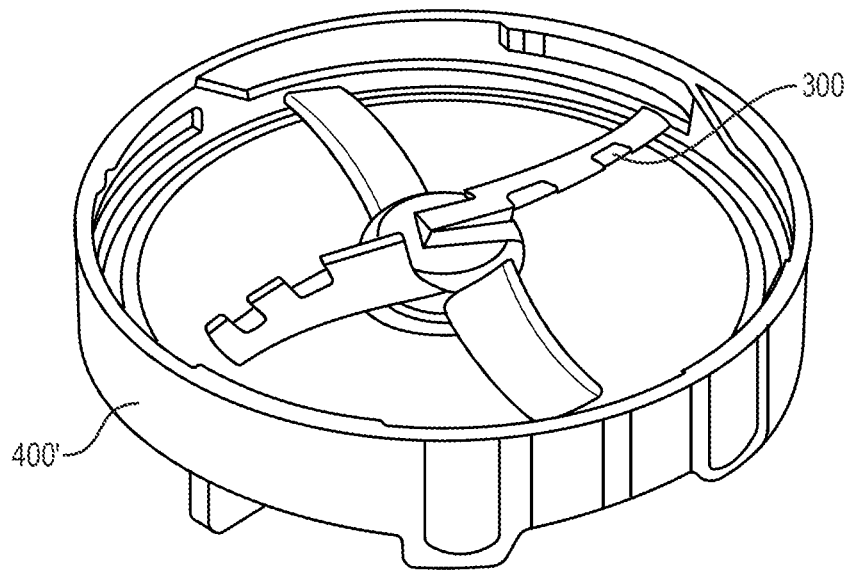
FIG. 3B shows a blade of the reversible bowl assembly of FIG. 3A, according to some embodiments of the disclosure.

FIG. 3A shows an embodiment of the reversible bowl assembly 350", assembled according to some embodiments of the disclosure. As shown in FIG. 3A, the bowl 352" may have an oblong shape and include a cylindrical sidewall 358 defining an interior volume 360 of the bowl 352". The sidewall 358 may extend between the first open end 352a" of the bowl 352" and the second open end 352b" opposite the first open end 352a". Embodiments of the sidewall 358 may have various configurations. For example, a cross-section of the sidewall may be circular or polygonal. In addition, a diameter of the sidewall may vary between the first open end 352a" and the second open end 352b" (e.g., may be tapered). The first open end 352a" and the second open end 352b" may communicate with the interior volume 360 of the bowl 352". The assembly 350" may further include a first lid 400' removably couplable to the first open end 352a" of the bowl 352". The first lid 400' may define an opening 401 (FIG. 3C) configured to couple to a blade 300 for mixing ingredients within the bowl 352". When the bowl 352" is installed to the coupling 500' in the first configuration, the blade 300 may engage with the driven shaft 250' to rotate and plunge the blade 300 within the ingredients. FIG. 3B shows an embodiment of the blade 300 coupled to the underside of first lid 400'. Some non-limiting examples of the blade 300 are shown in the '765 patent.

Figure 3C:
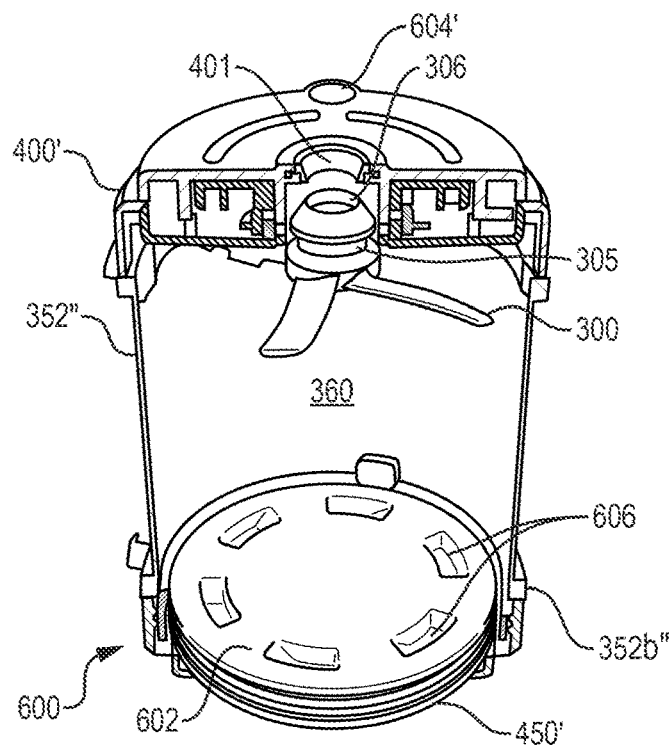
FIG. 3C is a cut-away view of the reversible bowl assembly and first lid of FIGS. 3A and 3B, according to some embodiments of the disclosure.

FIG. 3C is a cut-away view of the reversible bowl assembly 350" and the first lid 400', according to some embodiments of the disclosure, whereas blade 300 and a second lid 450' are not shown in cut-away form. As shown in FIG. 3C, the blade 300 may include a central support hub 305 including a central opening 306 for engaging the driven shaft 250. In embodiments, the second lid 450' may removably couple to the second open end 352b" of the bowl 352". The second lid 450' may include, or be coupled to, a plunger 602 for pushing the ingredients in the bowl 352" toward an opening 604 in first lid 400'. The plunger 602, alone or in combination with other components (e.g., the second lid 450', the bowl 352", or the nozzle 608), may constitute an extrusion assembly 600 for extruding processed ingredients from the bowl 352". The opening 604' in the first lid 400' may further be in fluid communication with a nozzle (e.g. nozzle 608). For example, the opening 604' may be in fluid communication with a nozzle through a conduit (e.g., plastic tubing) that extends from the opening 604' to the nozzle. In embodiments, such a conduit may include one or more sections connected by joints (e.g., an elbow joint) to translate the direction (e.g., horizontal) of extrusion from opening 604 to a direction (e.g., vertically downward) of extrusion from the nozzle.

The plunger 602 may be couplable to the driven shaft 250' of the micro-puree machine when the bowl assembly 350" is in the second configuration and the bowl 352" is installed to the coupling 500'. A surface of the plunger 602 facing the interior volume 360 may include a one or more (e.g., a plurality of) indentations 606. The indentations 606 may prevent frozen ingredients from rotational movement within the bowl 352" during processing by the blade 300. The plunger 602 may furthermore include a flexible seal 610 around its perimeter to ensure contact (e.g., maximum contact) with the sidewall 358 of the bowl 352" to allow for optimal (e.g., maximum) extrusion yield.

The micro-puree machine of the embodiments described in relation to FIGS. 2A, 2B, 3A-3D, 4B and 4B may include one or more motors and a transmission system (e.g., including gearing) that drive a driven shaft (e.g., driven shaft 250') for engaging the blade 300 and/or plunger 602 when the bowl assembly 350" (coupled to lid 400' or 450', respectively) is coupled to the housing for processing or extruding, for example, as described in the '765 patent or the '965 patent; and may include gearboxes (e.g., high ratio gearboxes) and reinforced internals (not shown) to allow the extrusion assembly 600 to withstand high forces and extrude thick outputs from a nozzle.

Figure 3D:
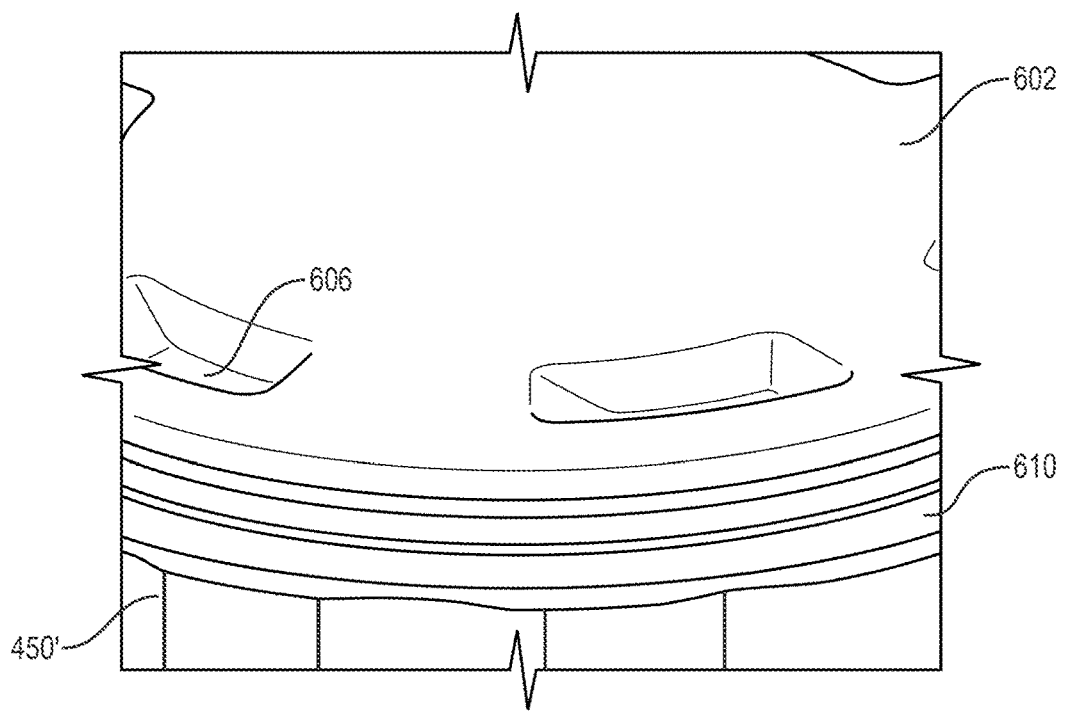
FIG. 3D shows a detailed view of an embodiment of a plunger coupled to the underside of second lid, according to some embodiments of the disclosure.

FIG. 3D shows a detailed view of an embodiment of the plunger 602 coupled to the underside of second lid 450'. In embodiments, the bowl assembly 350" may be configured such that only the first lid 400' can couple to the first open end 352a" of the bowl 352" and only the second lid 450' can couple to the second open end 352b" of the bowl 352". For example, a configuration of the threads 366 may be different from a configuration of the threads 368 (FIG. 3B) to prevent the user from attaching the wrong lid to the wrong side of the bowl 352". The bowl 352" may further include clear indicators (colors, icons, etc.) that would signal to the user which lid goes on which side of the bowl 352".

Figure 4A:
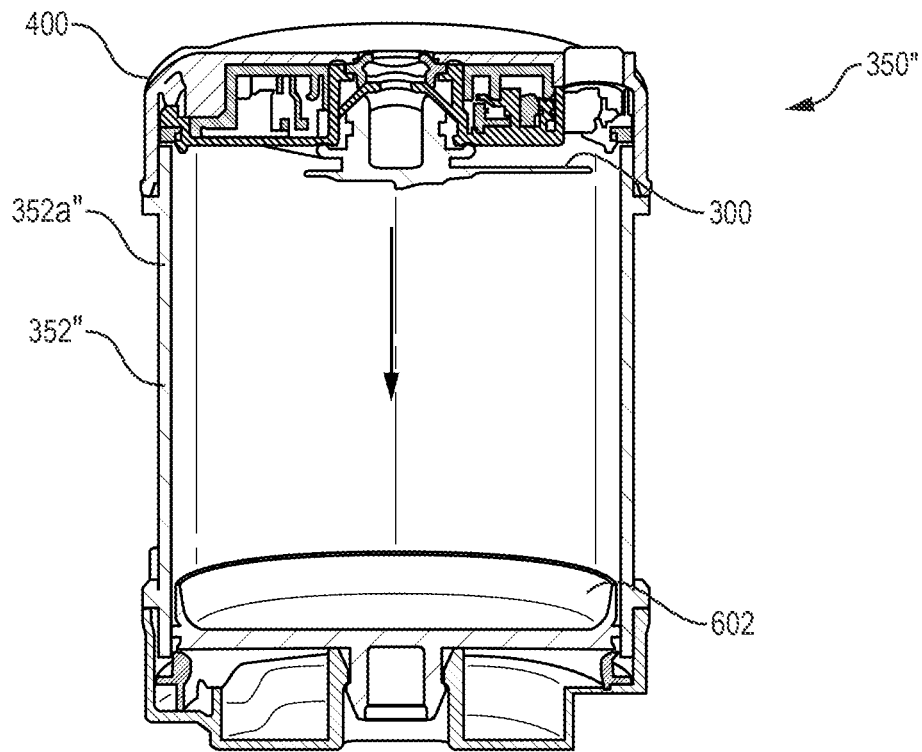
FIGS. 4A and 4B illustrate the use of the reversible bowl assembly of FIGS. 3A-3D, according to some embodiments of the disclosure.
Figure 4B:
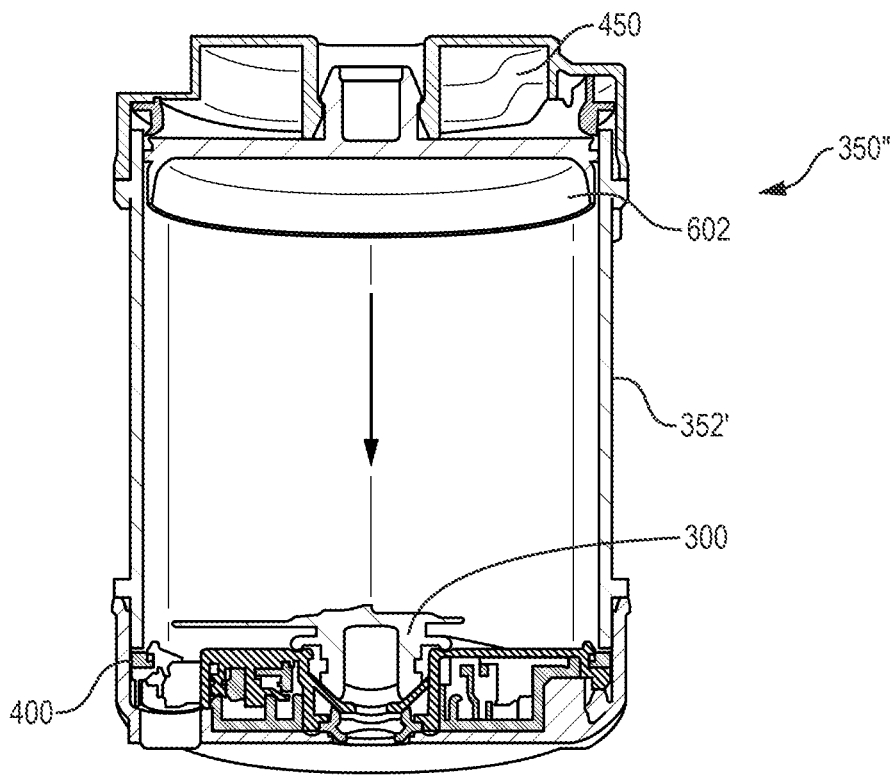

FIGS. 4A and 4B illustrate the use of the reversible bowl assembly 350" according to some embodiments of the disclosure. As shown in FIG. 4A, a user may first install the bowl assembly 350" to the micro-puree machine 10 in the first configuration such that the first end 352a" of the bowl 352" is secured to the coupling 500'. The user then may select a program at the user interface depending on the desired output (for example, soft serve ice cream, light ice cream, sorbet, gelato, etc.) to spin and plunge the blade 300 into the ingredients in the bowl 352". For example, the blade 300 may descend into the ingredients and then ascend from the ingredients at one or more predefined rates, while rotating at one or more predefined rates. As shown in FIG. 4B, the user then may then remove the bowl assembly 350" from the coupling 500', reverse the orientation of the bowl assembly 350" (i.e., flip the bowl assembly 350") and reinstall the second end 352b" of the bowl 352" to the coupling 500' in the second configuration. The user then may select a desired program at the user interface to descend the plunger 602 to extrude the ingredients out through the opening 604' in the first lid 400'. For example, the plunger 602 may descend into the ingredients to extrude the ingredients out through the opening 604' and then ascend from the opening 604' after the extrusion is complete.

While embodiments of the disclosure including performing processing and extrusion using a same driven shaft, in some embodiments, processing and extrusion are performed on different shafts, as will now be described.

Figure 5A:
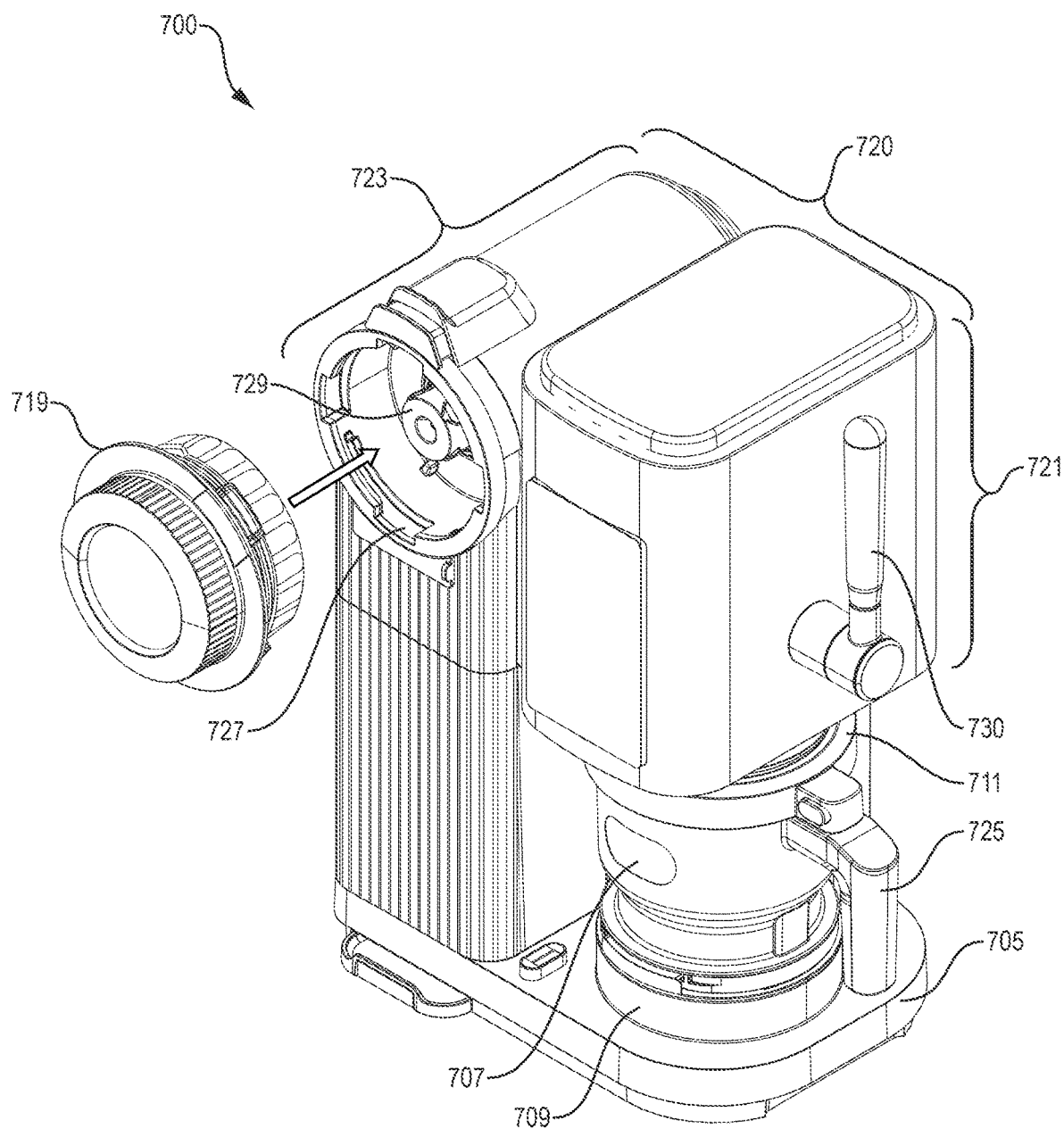
FIGS. 5A-5F illustrate another micro-puree machine, according to some embodiments of the disclosure.
Figure 5B:
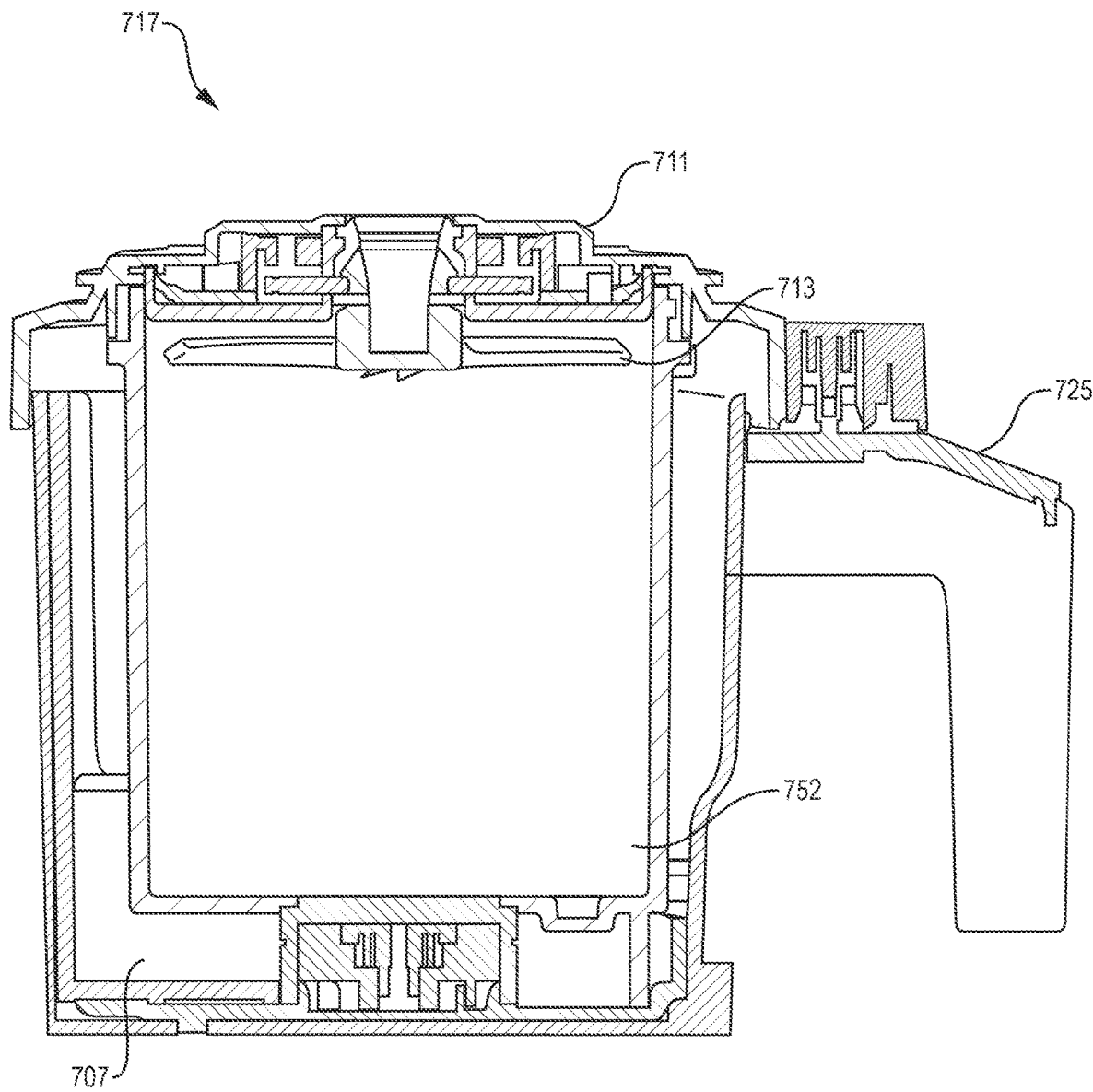
Figure 5C:
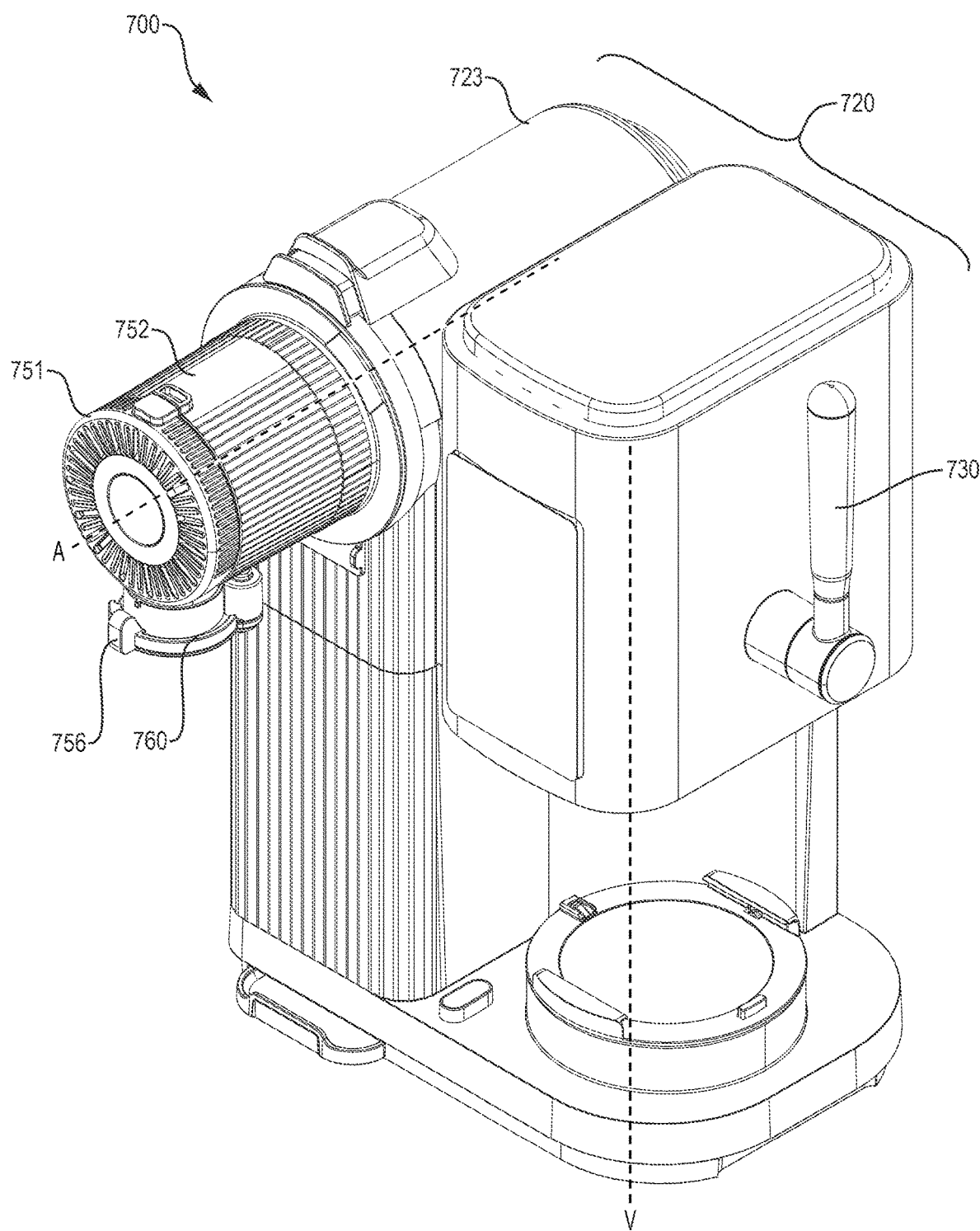
Figure 5D:
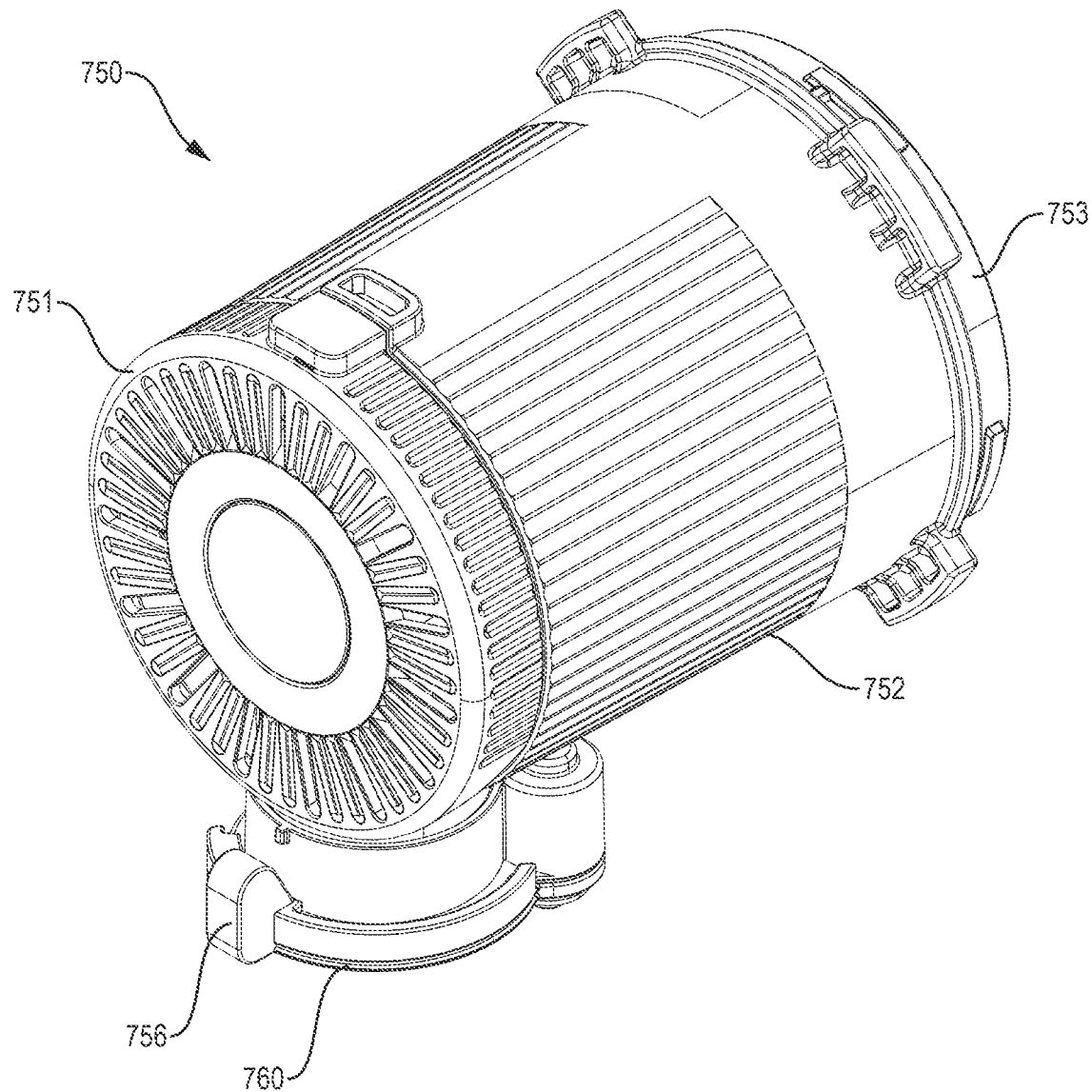
Figure 5E:
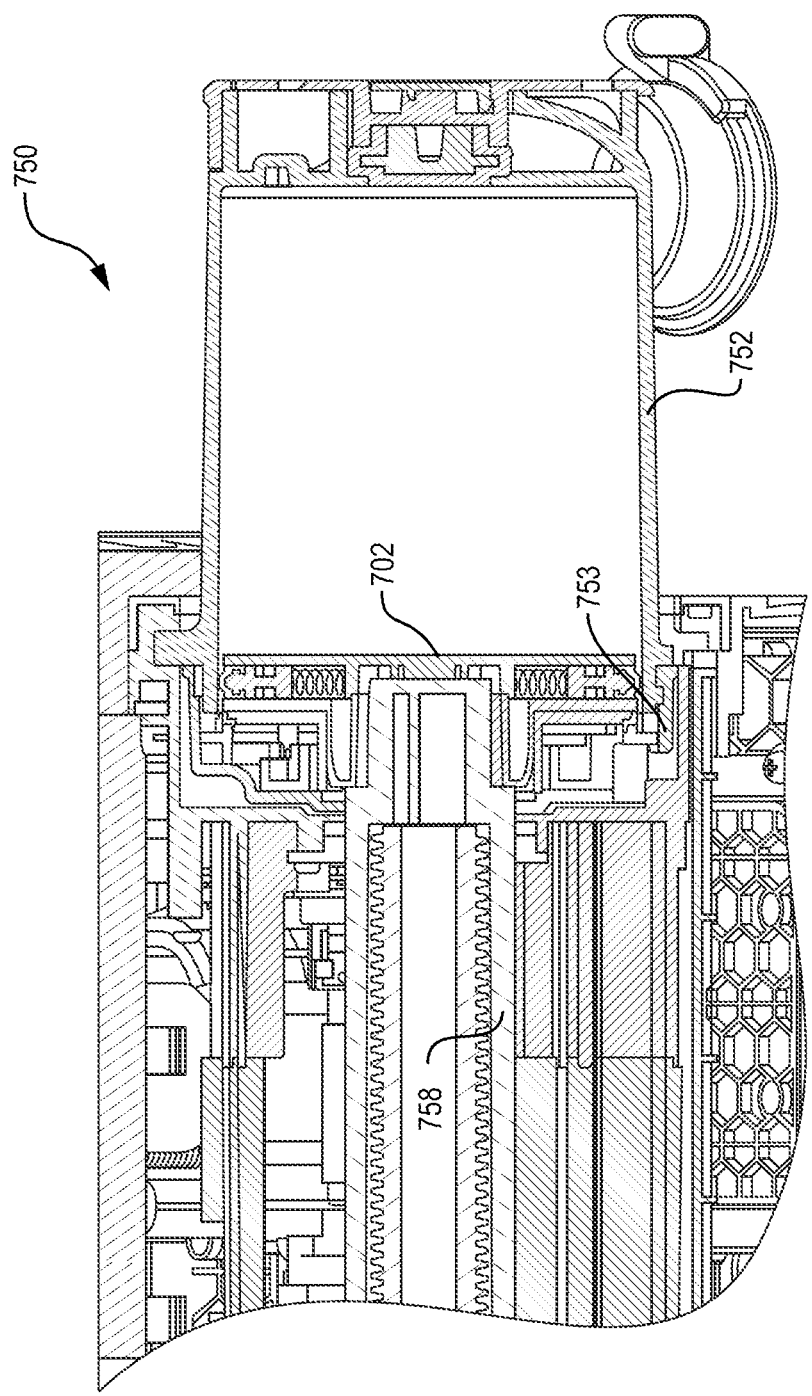
Figure 5F:
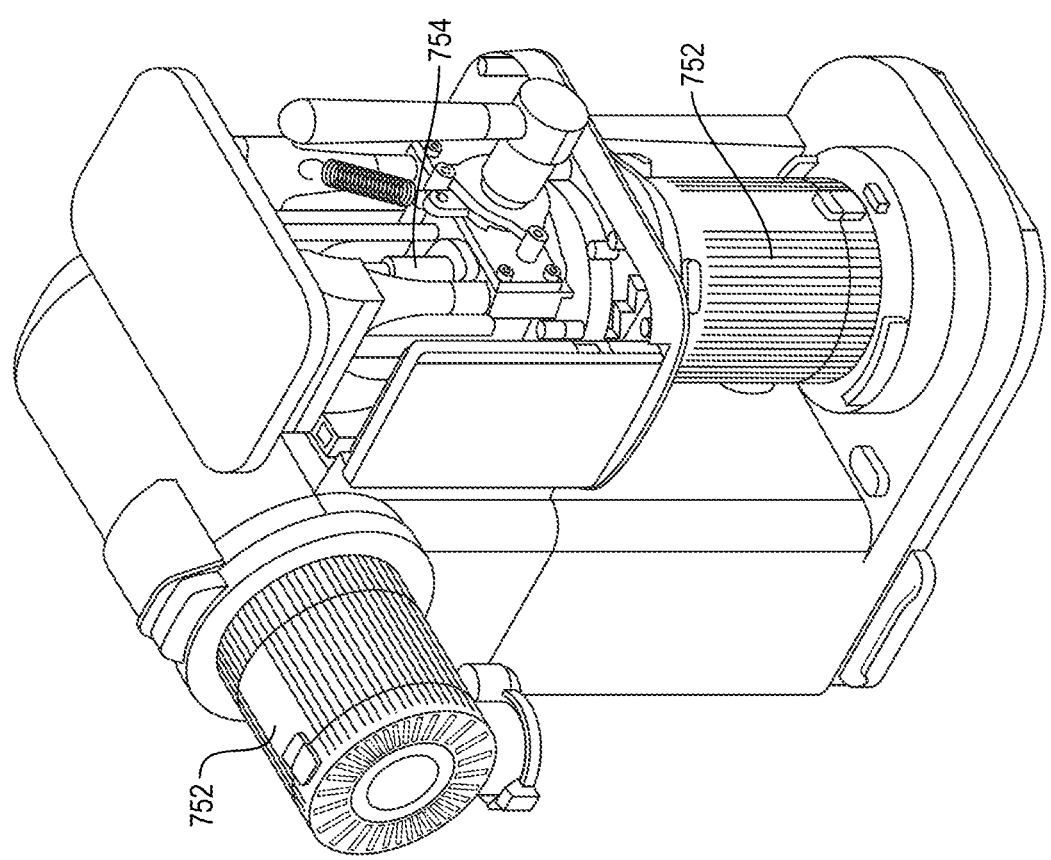

FIGS. 5A-5F illustrate another micro-puree machine 700, according to some embodiments of the disclosure. FIGS. 5A and 5B illustrate an embodiment of micro-puree machine 700 in a first configuration for processing (e.g., micropureeing), which may be referred to herein as a processing configuration. FIGS. 5C-5E illustrate an embodiment of micro-puree machine 700 in a first configuration for extruding, which may be referred to herein as an extruding or extrusion configuration. FIG. 5E illustrates an embodiment of micro-puree machine 700 in both processing and extruding configurations merely for illustrative purposes, as in some embodiments, the micro-puree machine 700 is not configured to perform processing and extruding concurrently.

As shown in FIGS. 5A and 5B, the micro-puree machine 700 may include a base 705 and a housing 720. The housing 720 may include a user interface (not shown) for receiving user inputs to control the micro-puree machine 700 and/or display information. In some embodiments, the micro-puree machine includes a processing sub-module 721 including one or more components configured to process ingredients in a bowl 752 (e.g., bowl 352 or a variation thereof) and an extruding sub-module 723 including one or more components configured to extrude processed ingredients from the bowl 752. In a processing configuration, the bowl 752 may be coupled to the interior of an outer bowl 707 that is mounted on a processing platform 709 mounted to the base 705. The bowl 752 may be coupled to a lid 711 (e.g., lid 442 or a variation thereof) that houses a blade 713 (e.g., blade 300 or a variation thereof). The bowl 752 may include a nozzle control assembly 751 (e.g., a dial) that enables a user to control an opening or closing of a nozzle 760, a nozzle 760, and a hinged stopper or plug 756 that can be used by a user to selectively cover the nozzle 760, or the nozzle control assembly 751. In some embodiments, the nozzle control assembly 751, the nozzle 760, and the stopper 756 may be removably attachable to the bowl 752. Using the handle 725, a user may rotate and elevate the processing bowl assembly 717 into a processing position in which the blade 713 engages with a driven shaft 754, the lid 711 couples to the micro-puree machine 700, and the blade 713 is released from the lid 711 so that the driven shaft 754 can drive the shaft 754, for example, as described in the '765 patent. By engaging the user interface (or via a remote interface wirelessly connected to a wireless interface within housing 720), the user may initiate processing of the ingredients in the bowl 752. In a processing configuration, extruding sub-module 723 may remain idle, and a cap or plug 719 may be coupled to a coupling 727, covering an interface 729 with driven shaft 758. The coupling 727 (e.g., coupling 500) also may serve as a coupling between the bowl assembly 750 (e.g., the lid 753 of the bowl assembly 750) and the micro-puree machine 700. After the processing of the ingredients, the processing bowl assembly 717 may be decoupled from the micro-puree machine 710 (e.g., from the processing sub-module 721), and de-mounted from the platform 709. The lid 711 may be removed from the outer bowl 707, and the bowl 752 may be removed from the outer bowl 707.

As shown in FIGS. 5C-5E, a lid 753 then may be mounted to the bowl 752, and the bowl 752 then may be coupled to the micro-processing machine 710 (e.g., to the extruding sub-module 723) in an extruding configuration. In the extruding configuration, the bowl 752 may be coupled to a lid 753 (e.g., lid 452 or a variant thereof) that includes a plunger 702. The combination of the bowl 752 and the lid 753 may be referred to herein as a bowl extruding assembly 750. In embodiments, the bowl extruding assembly 750 may be configured to be installed to the micro-puree machine 700 such that the nozzle 760 faces vertically downwards when the bowl extruding assembly 750 is properly installed. The bowl extruding assembly 750 may be assembled to the housing 720 (e.g., the extruding sub-module 723) such that a central axis A of the bowl extruding assembly 750 extends perpendicular to a vertical axis V of the housing 720, as shown. The bowl extruding assembly 750 may include an outlet 760 for extruding processed ingredients from the bowl extruding assembly 750. The micro-puree machine 700 also may include a lever 730 for manually activating a plunger 702 to extrude processed ingredients within the bowl extruding assembly 750 through the outlet 760. While the lever 730 is illustrated on a right side of the machine 700 (from the front view shown in FIG. 5C), the disclosure is not so limited. The lever 730 may be on the left side of, or another location on, the machine 700, and other components of the machine may be rearranged to accommodate the different location of the lever 730. The housing 720 may include electrical, electromagnetic, mechanical and/or electro-mechanical components to translate a pulling down or pushing up of the lever 730 into movement of the plunger 702 within the bowl 752.

Embodiments of the housing 720 of micro-puree machine 700 may house a transmission system that includes a driven shaft 754 for engaging the blade 713, a separate driven shaft 758 for engaging the plunger 702, one or more gearing systems, and one or more position and/or drive motors for moving the driven shaft 754 and the other shaft 758 rotationally and/or axially to process the ingredients in the bowl assembly 750. For example, a drive motor may drive the rotation of the driven shaft 754 and blade (e.g., blade 300) coupled thereto, and a position motor may drive the vertical (e.g., down and up) movement of the driven shaft 754 and a blade. Another motor may drive the second shaft 758 and a plunger (e.g., plunger 454 or 602) attached thereto. In embodiments, the blade 713 may be programmably controlled at the user interface by a computing system to operate at different rotational speeds and move up and down in different patterns and speeds, and for different periods of time, to make different food items. In embodiments, the plunger 702 in the lid 753 may be programmably controlled at the user interface by a computing system to operate at different rotational speeds (although rotation is not necessary for extruding) and move up and down in different patterns and speeds, and for different periods of time. Some non-limiting examples of a transmission system and the computing system are shown in described in the '765 patent and in U.S. Pat. No. 11,882,965 to SharkNinja Operating, LLC (the '965 patent), the entire contents of which are hereby incorporated by reference.

In some embodiments of the disclosure, a nozzle control assembly for a micro-puree machine (or other device for processing and/or extruding food) is provided for controlling the nozzle by which processed ingredients can be extruded from a bowl, as will now be described.

Figure 6A:
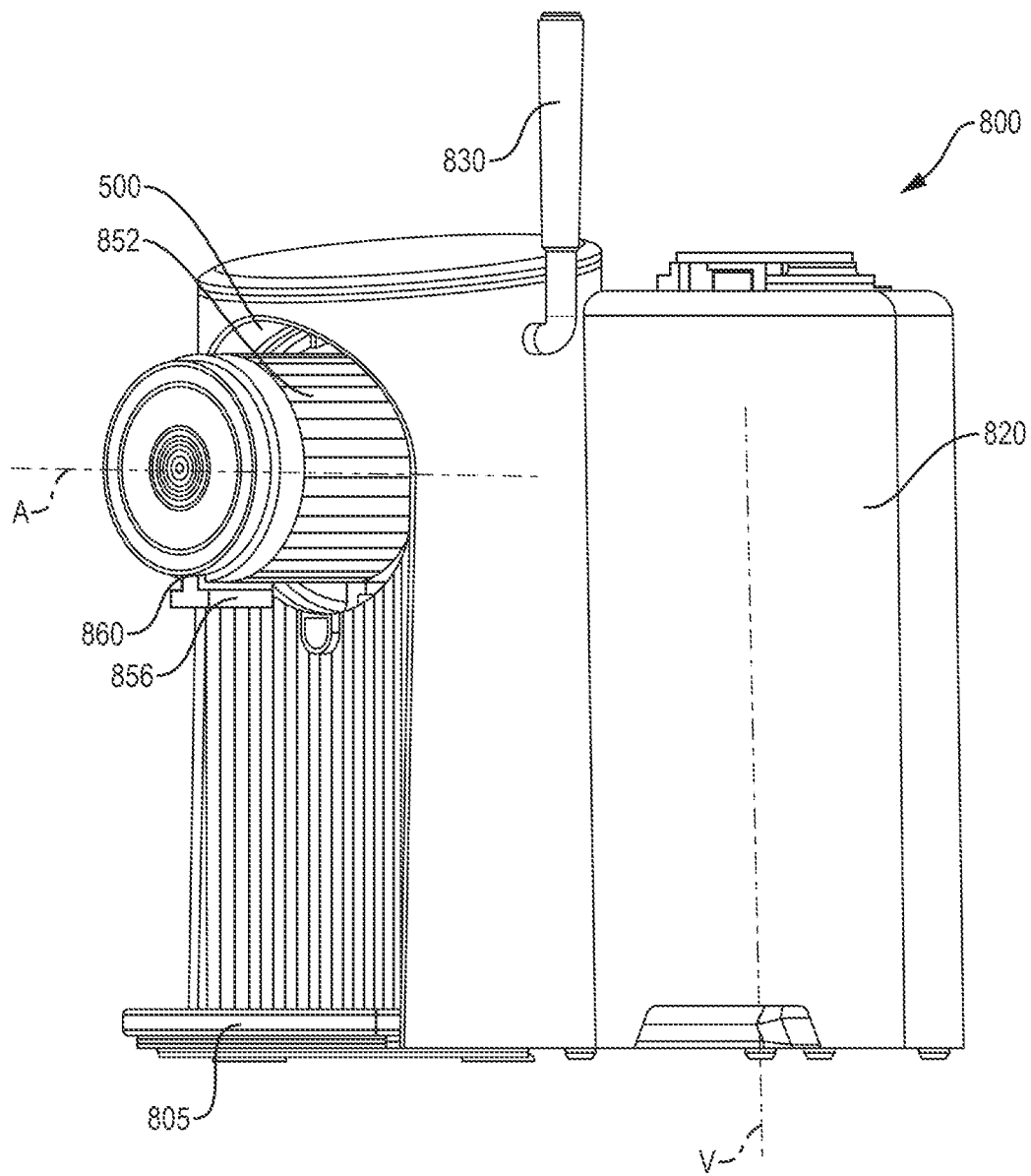
FIG. 6A illustrates a nozzle control assembly of a micro-puree machine, according to some embodiments of the disclosure.

FIG. 6A illustrates another micro-puree machine 800 that performs processing and extrusion using a same driven shaft, according to some embodiments of the disclosure. While embodiments of a nozzle control assembly are described in relation to a micro-puree machine (e.g., machine 800) that performs processing and extrusion using a same driven shaft, it should be appreciated that the disclosure is not so limited. A nozzle control assembly as described herein can be implemented on a micro-puree machine in which processing is performed on a first driven shaft and extrusion is performed on a second driven shaft or on another type of device for processing food. The micro-puree machine 800 may include a base 805 and a housing 820. The housing 820 may include a user interface (not shown) for receiving user inputs to control the micro-puree machine 800 and/or display information. The micro-puree machine 800 may also include the bowl 852. The bowl 852 may be assembled to the housing 820 such that a central axis A of the bowl 852 extends perpendicular to a vertical axis V of the housing 820, as shown. However, the disclosure contemplates that the bowl 850 may be assembled to the housing 820 such that the central axis A extends at an angle of between 0 and 90° to the vertical axis V, or such that the central axis A extends parallel to the vertical axis V. The micro-puree machine 810 may also include a lever 830 for activating the plunger (e.g., plunger 602) to extrude processed ingredients within the bowl 852 through a nozzle 860. The nozzle 860 may be integrated with the bottom edge of the bowl 852 and may be coverable with a hinged stopper or plug 856. In embodiments, the bowl 852 may be configured to be installed to the coupling (e.g., coupling 500) such that the nozzle 860 faces vertically downwards when the bowl 852 is properly installed. The nozzle 860 may be selectively located on the bowl 852 to optimize the amount of processed ingredients that can be extruded, thus minimizing the amount of yield loss after extrusion. For example, the nozzle 860 may be located near the bottom edge of the bowl 852, as shown in FIG. 6A. However, the disclosure also contemplates that the nozzle 860 may alternatively be located at a different longitudinal and/or radial position on the bowl 852.

Figure 6B:
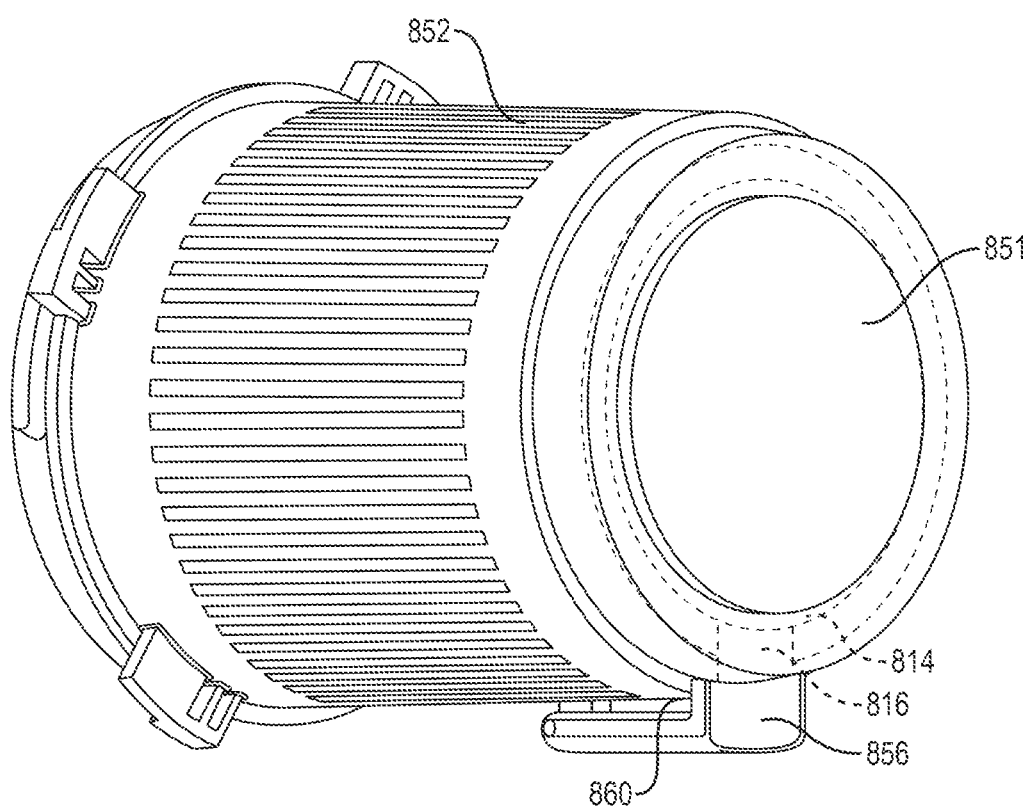
FIGS. 6B-6I illustrate the use of the nozzle control assembly of FIG. 6A, according to some embodiments of the disclosure.

FIG. 6B illustrates a nozzle control assembly including a rotatable dial 851 for use with the micro-puree machine 800, according to some embodiments of the disclosure. In this embodiment, the plug 856 may biased to an open position (e.g., spring-loaded). The plug 856 may be held and locked into the closed position through engagement of an L-shaped tab 816 on the plug 856 with an internal CAM path 814 on the dial 851. The dial 851 may also be biased (e.g., spring loaded) in a first rotational direction (e.g., clockwise). To open the plug 856, the user may rotate the dial 851 in a rotational direction (e.g., counterclockwise), causing the plug 856 to be released from the CAM path 814 and sprung into the open position, as further described elsewhere herein. When the plug 856 is in the open position, the user may extrude the processed ingredients through the nozzle 860.

Figure 6C:
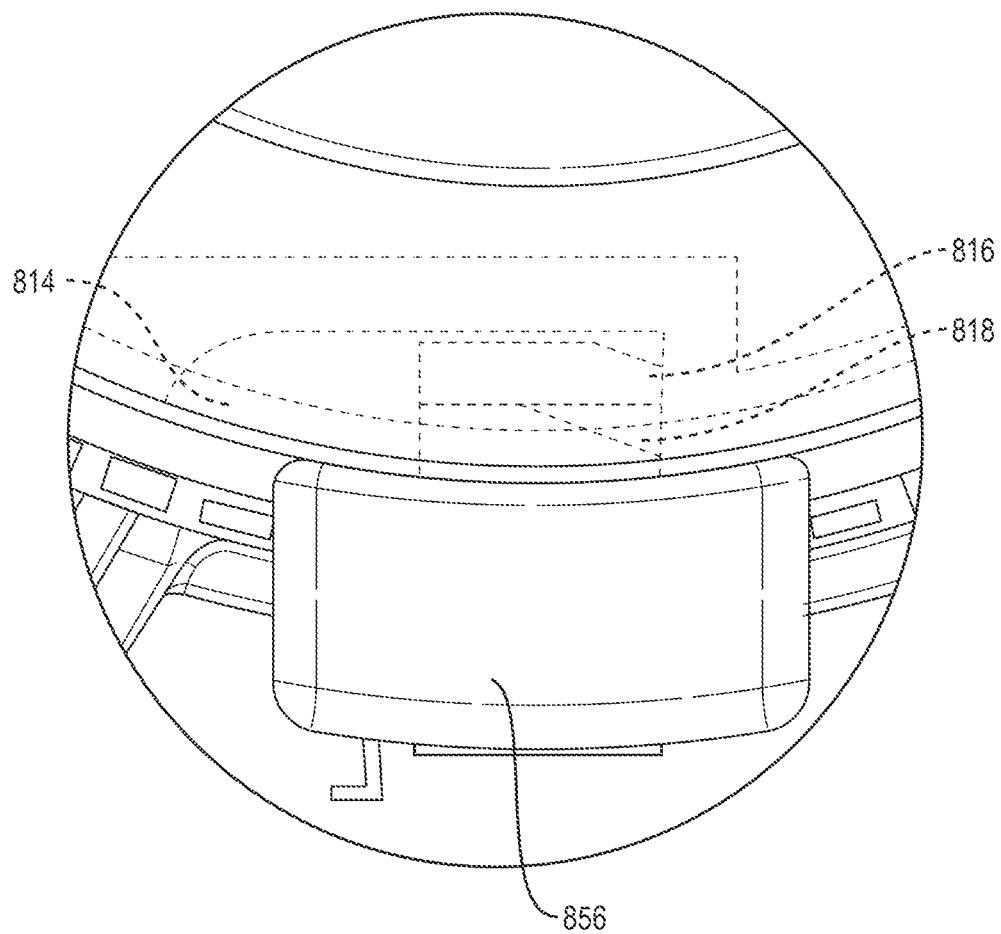
Figure 6D:
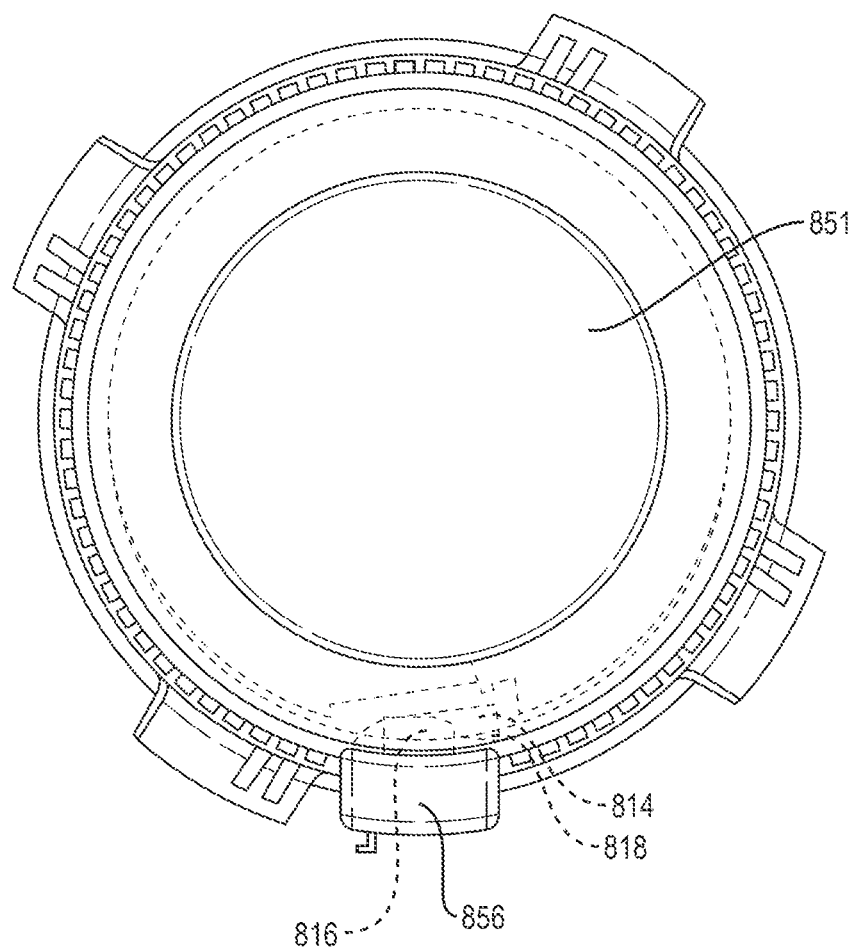
Figure 6E:
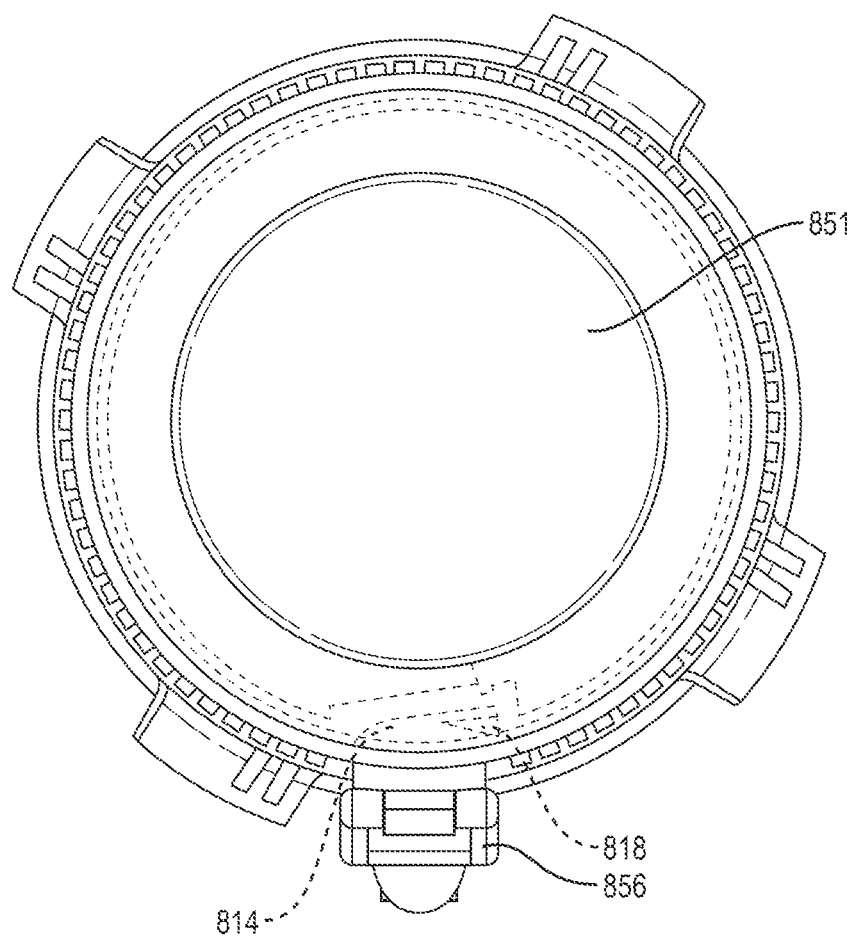
Figure 6F:
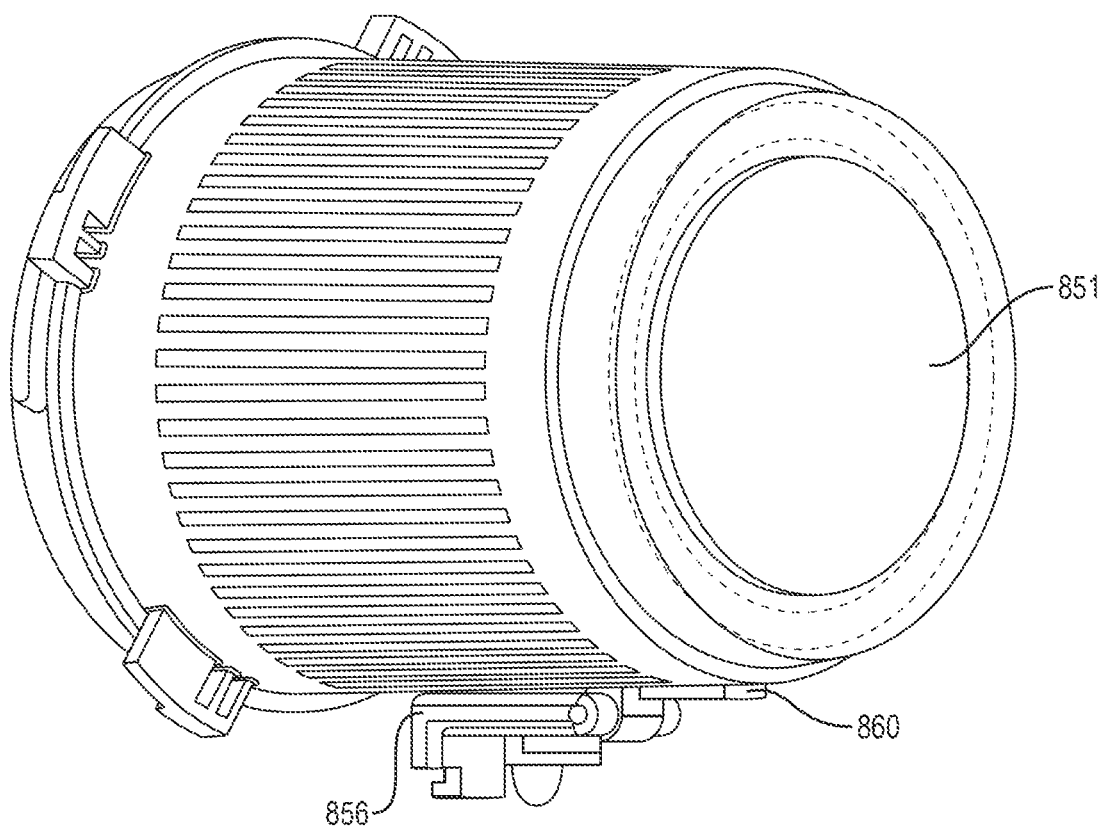
Figure 6G:
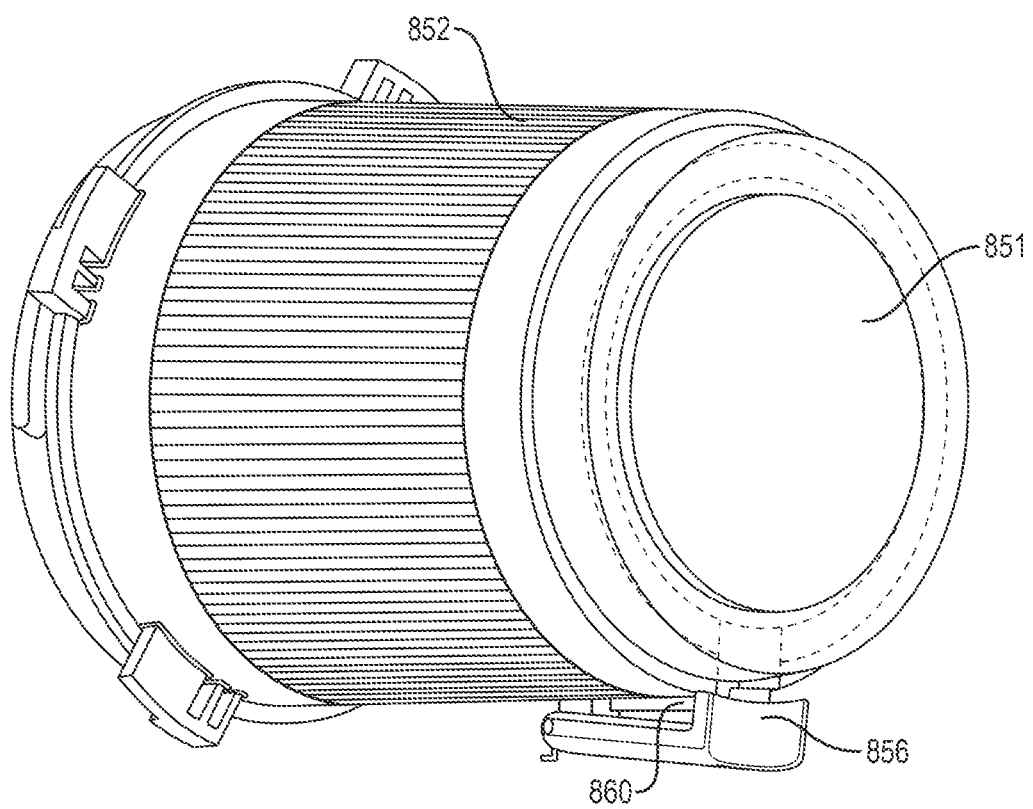
Figure 6H:
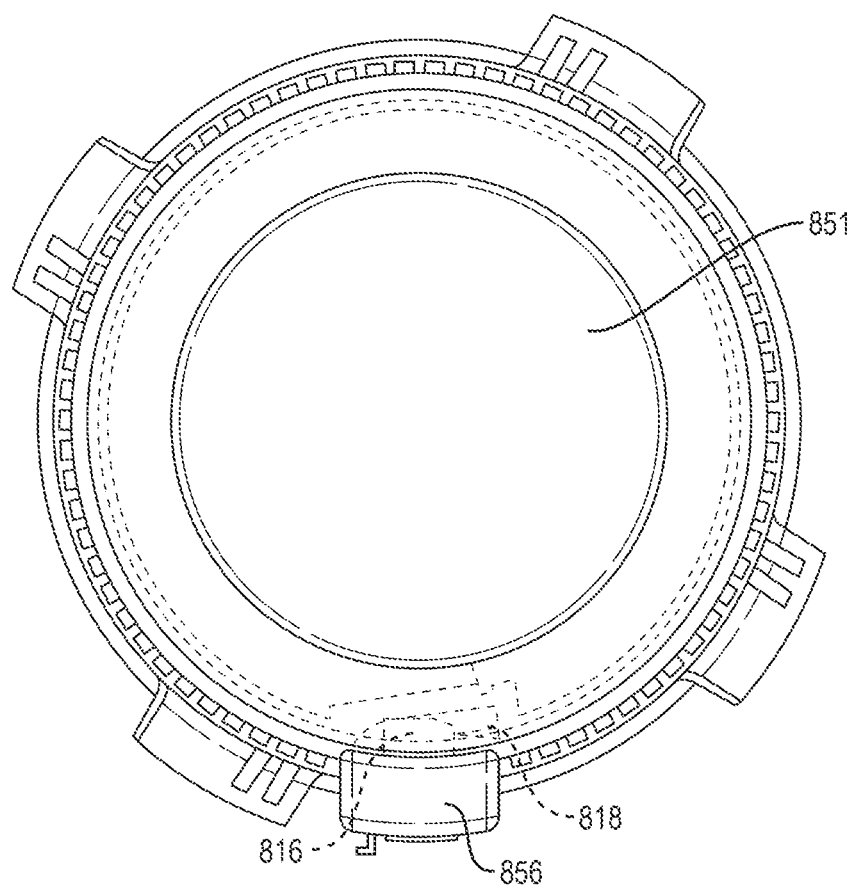
Figure 6I:
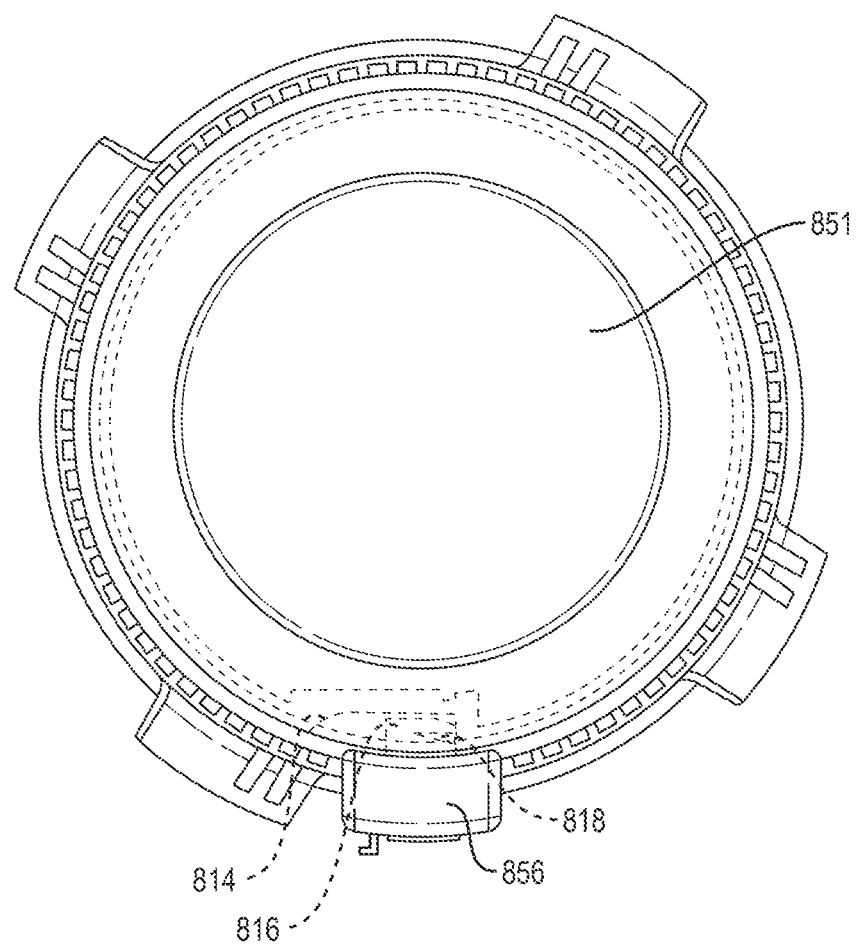

FIGS. 6C-6I illustrate the opening and closing of the plug 856 according to some embodiments of the disclosure. As shown in FIG. 6C, when the plug 856 is in the closed position, the tab 816 may be held within the CAM path 814 by a ramp 818. As shown in FIG. 6D, to open the plug 856, the user may rotate the dial 851 in the second rotational direction, causing the tab 816 to slide off the ramp 818 and disengage from the CAM path 814. As shown in FIG. 6E, when the tab 816 disengages from the CAM path 814, the plug 856 may automatically spring into the open position, exposing the nozzle 860 (FIG. 6F). The user may then release the dial 851 so that it springs automatically clockwise back to the home position. As shown in FIG. 6G, to close the plug 856 after extrusion of ingredients from the bowl 852, the user may manually push the plug 856 back into engagement with the nozzle 860. As shown in FIG. 6H, when the plug 856 is pushed back into engagement with the nozzle 860, the tab 816 on the plug 856 may again engage the ramp 818, causing the dial 851 to move slightly counterclockwise. As shown in FIG. 6I, once the tab 816 has moved past the ramp 818, the dial 851 may again be free to rotate clockwise, locking the plug 856 into the CAM path 814.

The disclosure further contemplates that, to prevent users from sticking their fingers into the bowl 852 through the nozzle 860 during extrusion, a cross rib (not shown) may be placed over the nozzle 860. Additionally, a magnet (not shown) in the hinged plug 856 may interact with a reed switch in the housing 820 when the plug 856 is in the open position to allow the machine 800 to detect whether the plug 856 is open or closed. The machine 800 may further be configured to prevent processing programs to run when the plug 856 is determined to be open.

FIGS. 7A-7J illustrate another nozzle control assembly including a rotatable dial 951 for use with a micro-puree machine (e.g., micro-puree machine 700), according to some embodiments of the disclosure. FIGS. 7A-7F illustrate various aspects of the dial 951 in an open position, while FIGS. 7G-7J illustrate the dial 951 in a closed position.

Figure 7A:
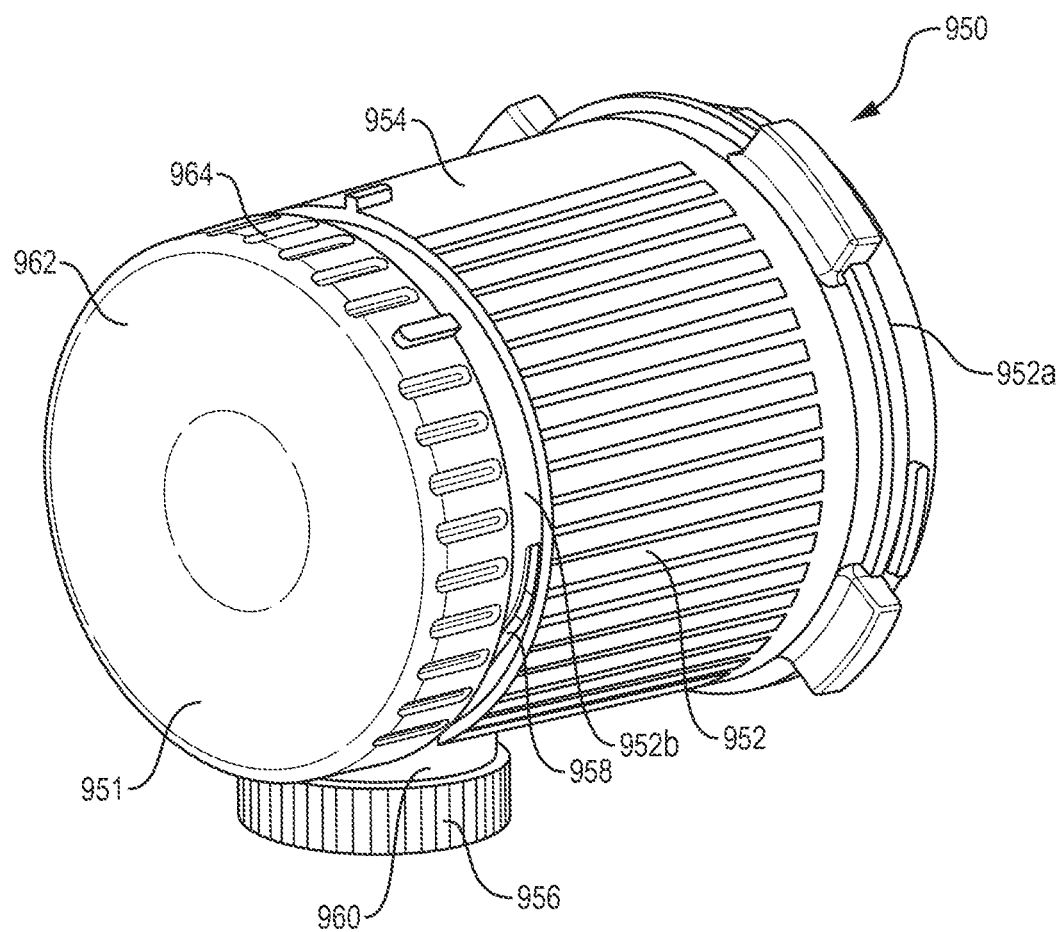
FIGS. 7A-7F illustrate another nozzle control assembly of a micro-puree machine in an open position, according to some embodiments of the disclosure.

As shown in FIG. 7A, a bowl assembly 950 may include a bowl 952 having a first end 952a for coupling to a lid (e.g., lid 753) and a second end 952b. A sidewall 954 may extend between the first end 952a and the second end 952b and define an interior volume of the bowl 952. The second end 952b of the bowl may include a nozzle 960. An outer surface of the second end 952b may define at least one cam track 958 extending at least partially around the second end 952b, as described elsewhere herein. The dial 951 may be configured to rotate about the second end 952b of the bowl 952. The dial 951 may be permanently affixed to the second end 952b of the bowl 952 or the dial 951 may be completely removeable from the bowl 952.

Figure 7B:
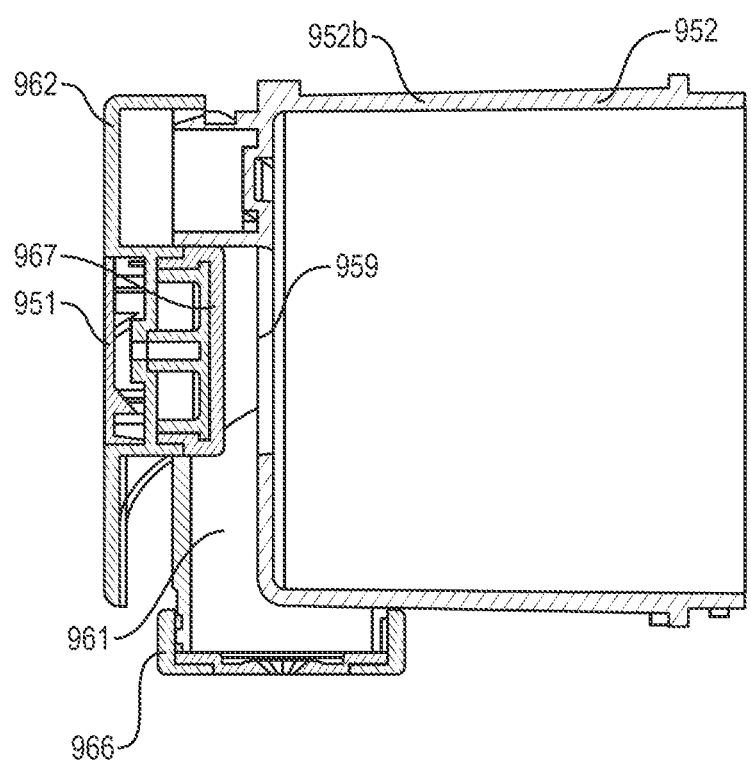
Figure 7C:
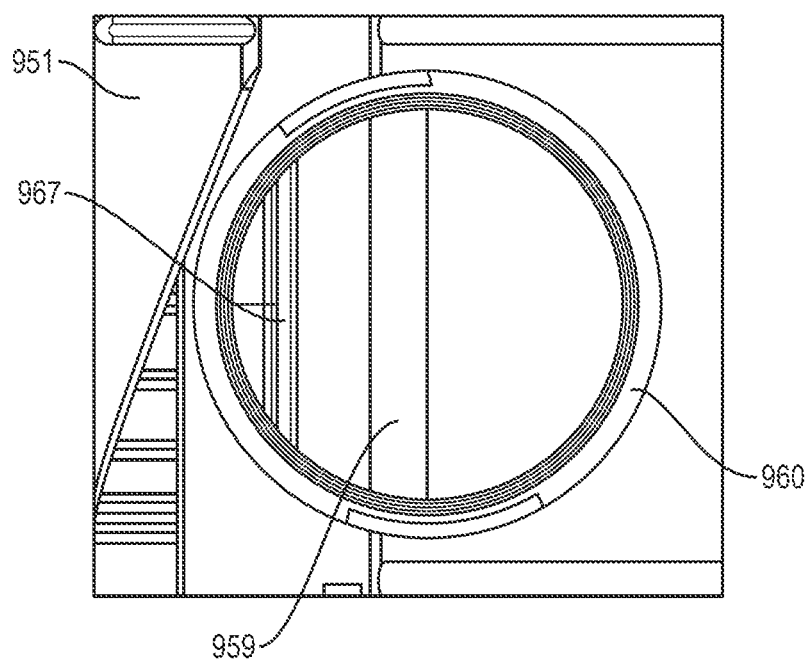

The dial 951 may comprise a bottom wall 962 and a sidewall 964 extending from the bottom wall 962. The sidewall 964 may be configured to cover the second end 952b of the bowl 952 when the dial 951 is assembled to the bowl 952. As shown in FIG. 7B, the second end 952b of the bowl 952 may have at least one opening 959 in communication with the interior volume of the bowl 952 and with a channel 961 of the nozzle 960. An interior surface of the bottom wall 962 may further include a seal 967 for sealing the channel 961 when the dial 951 is in a closed position. The nozzle 960 may further include a stopper or cap 956 that can be used by a user to selectively cover a nozzle 960 when not in use. The cap 956 may include interior threading (not shown) or other coupling features that allow it to couple to the nozzle 960. As shown in FIG. 7C, when the dial 951 is in the open position, a space between the seal 967 and the opening 959 may be wide enough to allow for easy extrusion of frozen ingredients through the nozzle 960, while also narrow enough to prevent a user from inserting their fingers into the nozzle 960.

Figure 7D:
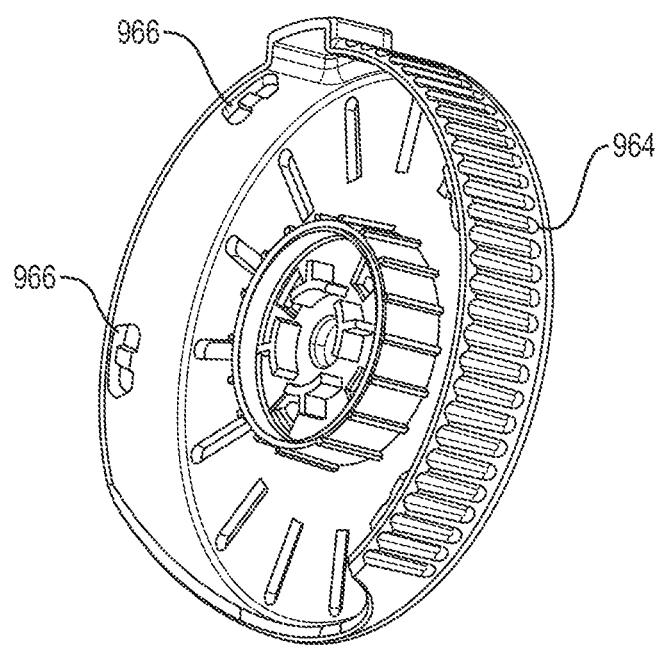
Figure 7E:
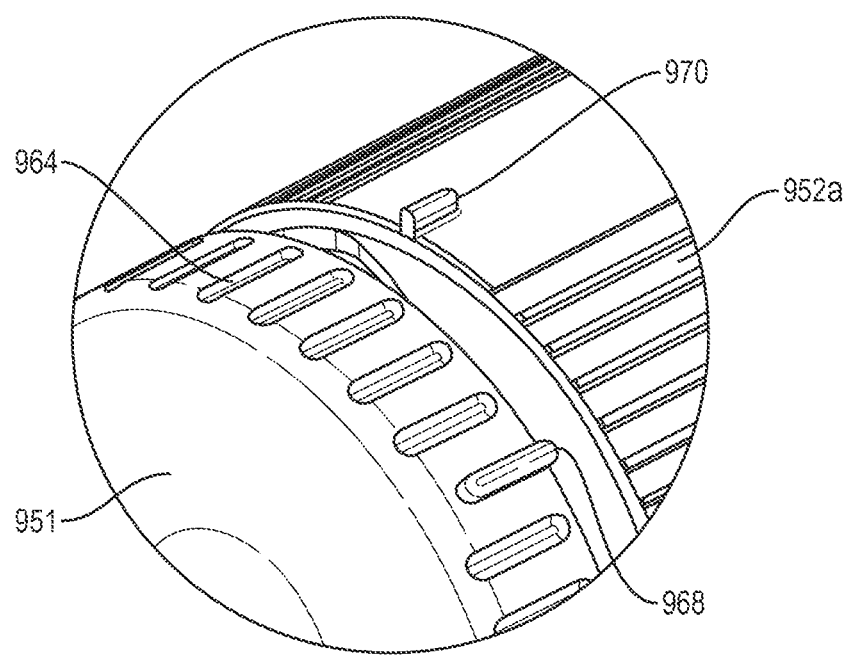

As shown in FIG. 7D, an interior surface of the sidewall 964 may have at least one engagement feature (e.g., a pin 966) for engaging and sliding along the cam track 958. The number of pins 966 may be selected to be the same as the number of cam tracks 958 on the bowl 952. For example, the number of pins 966 may be four pins 966 corresponding to four cam tracks 958, as shown. However, the disclosure contemplates that the number of pins 966 may differ from the number of cam tracks 958. As shown in FIG. 7E, an outer surface of the sidewall 964 may include a first rib 968 configured to align with a second rib 970 on the second end 952b of the bowl 952 when the dial 951 is in the closed position.

Figure 7F:
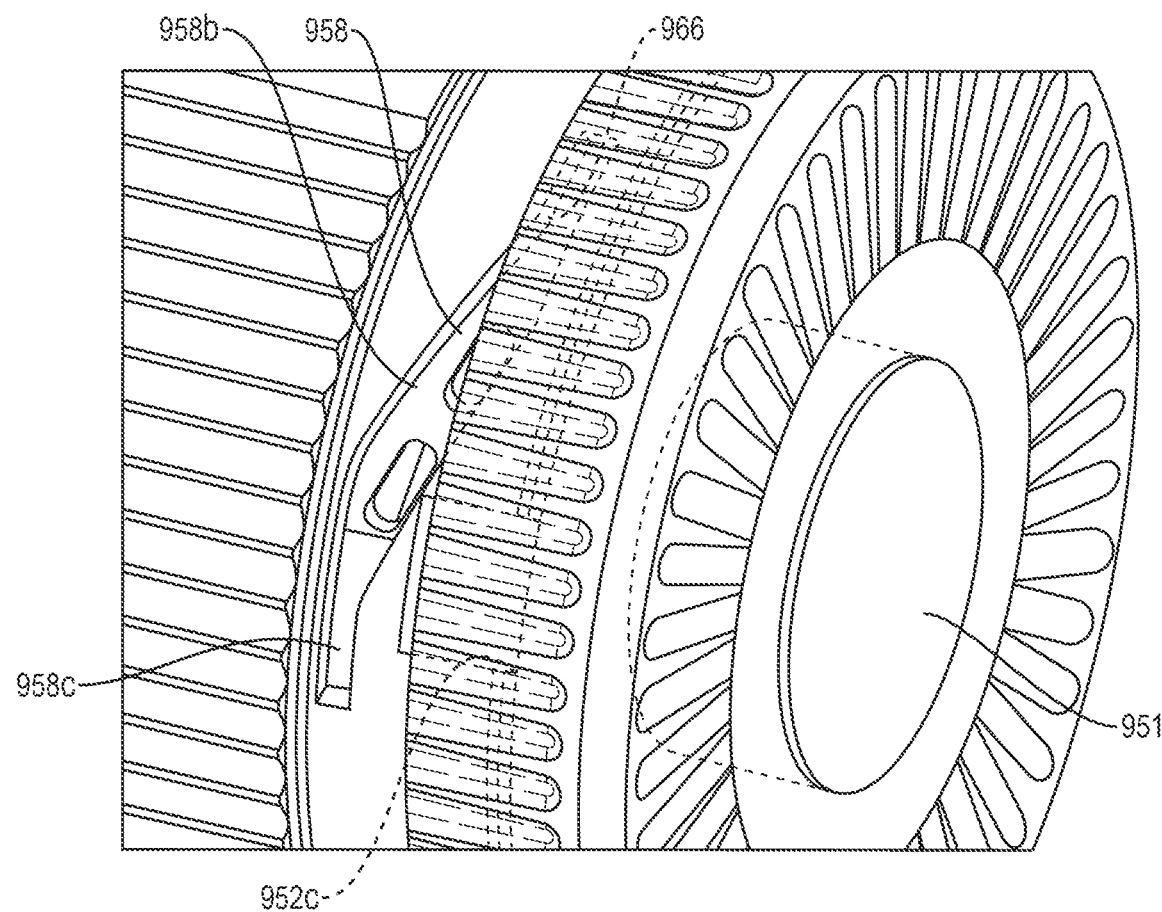
Figure 7G:
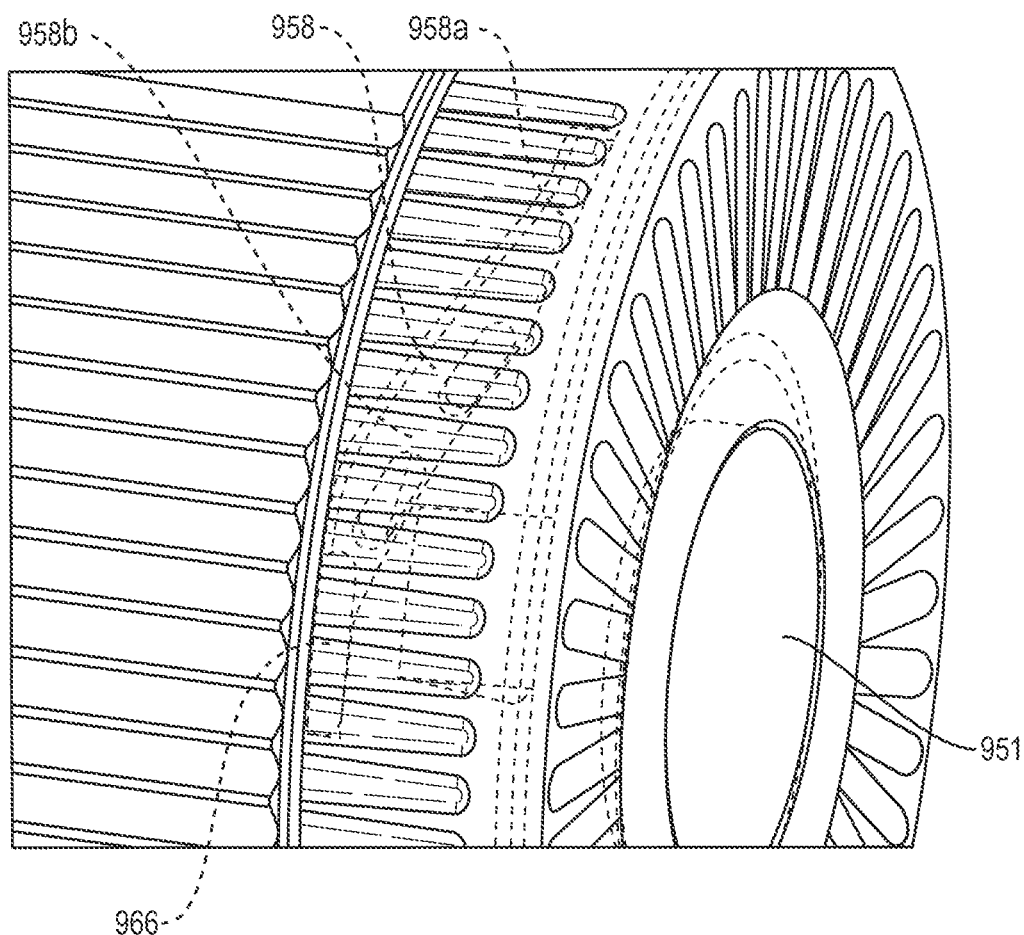
FIGS. 7G-7J illustrate the nozzle control assembly of FIGS. 7A-7F in a closed position, according to some embodiments of the disclosure.

FIGS. 7F and 7G illustrate the rotation of the pins 966 into the cam track 958, according to some embodiments of the disclosure. In FIGS. 7E and 7F, the dial 951 is shown in a transparent view for ease of illustration. The cam track 958 may comprise a first portion 958a that extends substantially parallel to a bottom edge 952c of the bowl 952, a second portion 958b that extends at an angle with respect to the bottom edge 952c, and a third portion 958c that also extends substantially parallel to the bottom edge 952c. In the open position of the dial 951, the pin 966 may be positioned within the first portion 958a of the cam track 958. As the user rotates the dial 951 (e.g., counterclockwise), the pin 966 may slide within the second portion 958b into the third portion 958c of the cam track 958. A width of the third portion 958c may be selected such that an interference fit is formed between the pin 966 and the third portion 958. As such, the dial 951 is prevented from opening during freezing and processing of the ingredients in the bowl 952 until a force is exerted on the dial 951 sufficient to move the pin 966 out of the third portion 958c.

Figure 7H:
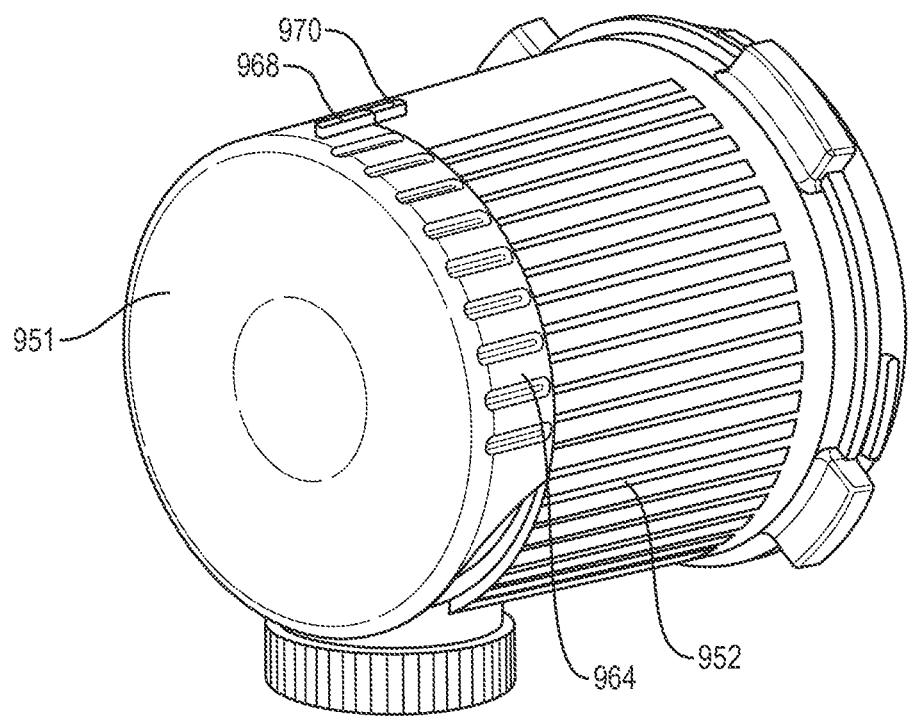
Figure 7I:
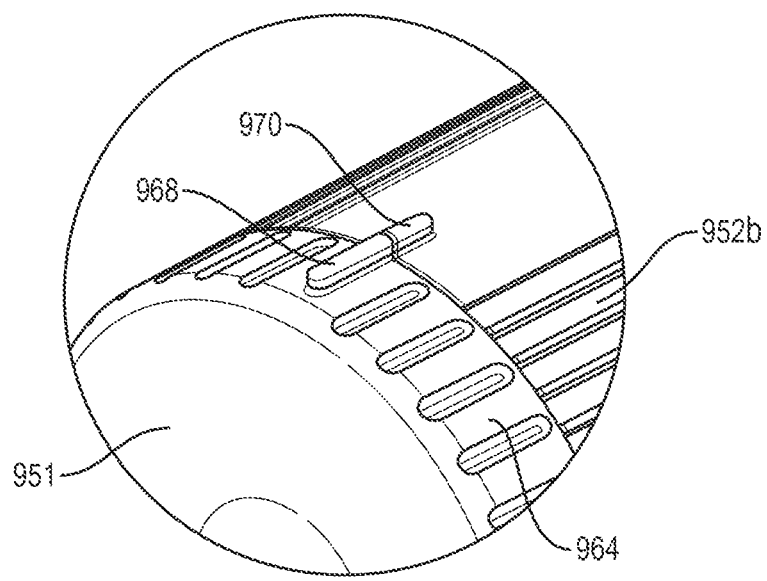
Figure 7J:
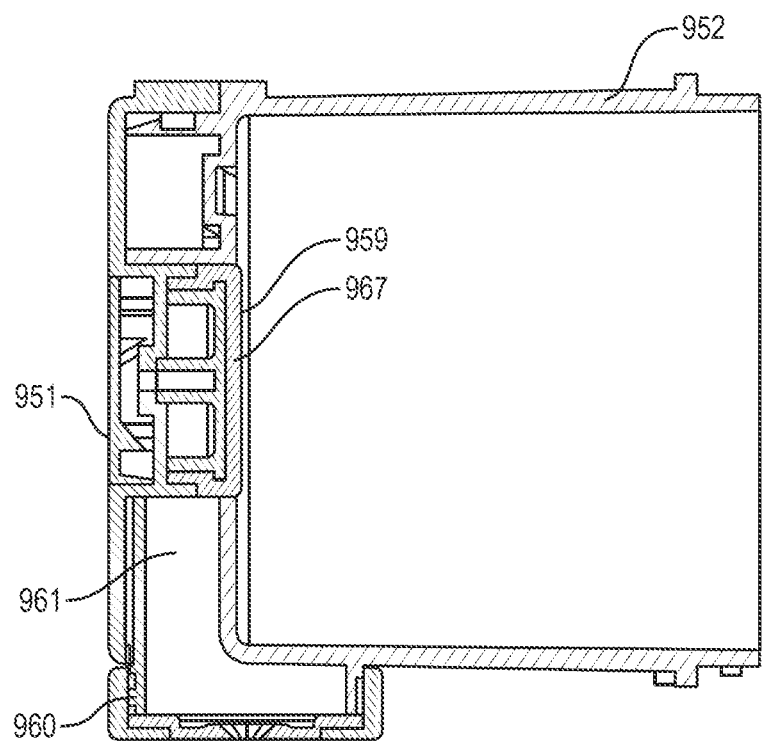

FIGS. 7H-7J illustrate the dial 951 in the closed position, according to some embodiments of the disclosure. As shown in FIGS. 7H and 7I, when the dial 951 is in the closed position, the first rib 968 on the sidewall 964 of the dial 951 may align with the second rib 970 on the second end 952b of the bowl 952. In this way, a user may visually verify that the dial 951 is in the fully closed position and that the bowl 952 is completely sealed before freezing the ingredients within the bowl or beginning the extrusion process. Furthermore, as shown in FIG. 7J, when the dial 951 is in the fully closed position, the seal 967 may close the opening 959 in the bowl 952, thus also sealing the channel 961 of the nozzle 960. The sealing of the channel 961 may prevent the inadvertent extrusion of ingredients from the bowl 952 during freezing and processing. Advantageously, a diameter of seal 967 may be selected to be sufficiently large such that an ice wall formed in the ingredients during freezing may be broken by the unsealing of the seal 967 from the opening 959.

The disclosure contemplates that, in some embodiments, the bowl from which ingredients are processed and/or extruded (e.g., bowl 352, 352', 352", 752, 852, 952) can be coupled vertically in an inverted orientation (i.e., downward) on a top or upward-facing surface of the housing (e.g., housing 120, 720) of a micro-puree machine (e.g., micro-puree machine 10, 700) whereby the blade (e.g., blade 300, 713) moves up and then down to creamify, process, and/or mix ingredients in the bowl. The upward-facing surface may face vertically upward or be angled in an upward direction. In some embodiments, the micro-puree machine may be configured to automatically detect a size of the bowl and, in response to the detection, extend the blade a depth and/or travel distance into the bowl based on the detected size of the bowl. This bowl-size detection would advantageously enable the micro-puree machine to process ingredients in different sized containers, such as a single serve container or larger containers.

While the disclosure particularly shows and describes preferred embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

What is claimed is:

1. A nozzle control assembly for a bowl for use with a micro-puree machine, the bowl having a first end, a second end, and a sidewall extending between the first and second ends, the sidewall defining an interior volume of the bowl, the second end of the bowl including a nozzle in fluid communication with an interior of the bowl, the nozzle control assembly comprising:
   a stopper configured to be arranged in a first position, in which the stopper covers the nozzle, and a second position, in which the stopper does not cover the nozzle, wherein the stopper is a hinged plug; and
   a dial rotatable relative to the second end of the bowl, the dial configured to control extrusion of processed ingredients from the interior volume of the bowl through the nozzle.

2. The nozzle control assembly of claim 1, wherein the bowl is configured to be oriented relative to the micro-puree machine such that the nozzle is positioned in a vertically downward direction.

3. The nozzle control assembly of claim 1, wherein the nozzle is integrated with the bowl.

4. The nozzle control assembly of claim 1, wherein the nozzle is positioned near the second end of the bowl.

5. The nozzle control assembly of claim 1, wherein the dial is configured to move the stopper from the first position to the second position.

6. The nozzle control assembly of claim 5, wherein the stopper is biased towards the second position.

7. The nozzle control assembly of claim 5, wherein the stopper comprises a tab configured to lock into a CAM path on the dial when the stopper is in the first position.

8. The nozzle control assembly of claim 7, wherein the dial is biased in a first rotational direction, and wherein rotation of the dial in a second rotational direction causes the tab to disengage from the CAM path.

9. The nozzle control assembly of claim 8, wherein manual movement of the stopper from the second position to the first position causes the dial to rotate in the second rotational direction.

10. The nozzle control assembly of claim 1, wherein an outer surface of the second end of the bowl defines at least one cam track extending at least partially around the second end of the bowl.

11. A nozzle control assembly for a bowl for use with a micro-puree machine, the bowl having a first end, a second end, and a sidewall extending between the first and second ends, the sidewall defining an interior volume of the bowl, the second end of the bowl including a nozzle in fluid communication with an interior of the bowl, wherein an outer surface of the second end of the bowl defines at least one cam track extending at least partially around the second end of the bowl, the nozzle control assembly comprising:
   a stopper configured to be arranged in a first position, in which the stopper covers the nozzle, and a second position, in which the stopper does not cover the nozzle; and
   a dial rotatable relative to the second end of the bowl, the dial configured to control extrusion of processed ingredients from the interior volume of the bowl through the nozzle wherein an interior surface of the dial comprises at least one pin for engaging the at least one cam track for rotating the dial between an open position and a closed position.

12. The nozzle control assembly of claim 11, wherein, in the closed position, a seal on the dial engages an opening in the bowl, preventing the extrusion of the processed ingredients from the interior volume of the bowl through the nozzle.

13. The nozzle control assembly of claim 12, wherein, in the open position, the seal on the dial is spaced away from the opening, allowing the extrusion of the processed ingredients from the interior volume of the bowl through the nozzle.

14. The bowl of claim 12, wherein the bowl is configured to be oriented relative to the micro-puree machine such that the nozzle is positioned in a vertically downward direction.

15. The bowl of claim 12, wherein the nozzle is integrated with the bowl.

16. The bowl of claim 12, wherein the nozzle is positioned near the second end of the bowl.

17. A bowl for use with a micro-puree machine, the bowl comprising:
   a first end, a second end, and a sidewall extending between the first and second ends, the sidewall defining an interior volume of the bowl, the second end of the bowl including a nozzle in fluid communication with an interior of the bowl;
   a stopper configured to be arranged in a first position, in which the stopper covers the nozzle, and a second position, in which the stopper does not cover the nozzle, wherein the stopper is a hinged plug; and
   a dial rotatable relative to the second end of the bowl, the dial configured to control extrusion of processed ingredients from the interior volume of the bowl through the nozzle.

* * * * *